(12) United States Patent
Kitajima

(10) Patent No.: US 9,338,419 B2
(45) Date of Patent: May 10, 2016

(54) IMAGE PROCESSING APPARATUS AND CONTROL METHOD THEREFOR

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/629,976

(22) Filed: Feb. 24, 2015

(65) Prior Publication Data

US 2015/0172617 A1   Jun. 18, 2015

Related U.S. Application Data

(63) Continuation of application No. 13/922,525, filed on Jun. 20, 2013, now Pat. No. 8,988,549.

(30) Foreign Application Priority Data

Jun. 22, 2012   (JP) .................................. 2012-141466

(51) Int. Cl.
*H04N 9/73*   (2006.01)
*G06K 9/46*   (2006.01)

(52) U.S. Cl.
CPC . *H04N 9/735* (2013.01); *G06K 9/46* (2013.01)

(58) Field of Classification Search
CPC .................................. H04N 9/735; G06K 9/46
USPC ...................................................... 348/223.1
See application file for complete search history.

(56) References Cited

U.S. PATENT DOCUMENTS

| 7,514,669 | B2 | 4/2009 | Hashimoto et al. |
| 8,503,771 | B2 | 8/2013 | Masato |
| 2008/0001063 | A1* | 1/2008 | Hashimoto et al. ........... 250/206 |
| 2009/0147098 | A1 | 6/2009 | Li |
| 2012/0155753 | A1* | 6/2012 | Masato .......................... 382/162 |

FOREIGN PATENT DOCUMENTS

| JP | 5-064219 A | 3/1993 |
| JP | 2007-013415 A | 1/2007 |
| JP | 2010-021651 A | 1/2010 |
| JP | 4447520 B | 4/2010 |

OTHER PUBLICATIONS

Japanese office action issued in corresponding application No. 2012141466 on Jan. 22, 2016.

* cited by examiner

*Primary Examiner* — Gevell Selby
(74) *Attorney, Agent, or Firm* — Carter, DeLuca, Farrell & Schmidt, LLP

(57) ABSTRACT

An image processing apparatus is provided that allows accurate white balance gains to be obtained by accurately estimating the illuminant colors of various objects in an image. The white balance gains are obtained based on values of white pixels that have been extracted from an input image and have colors included in an extraction range, and the white balance gains are obtained based on specular reflection components included in the input image, are mixed in accordance with a mix ratio. The mix ratio is determined in accordance with, for example, a degree of reliability of extraction of the white pixels.

10 Claims, 13 Drawing Sheets

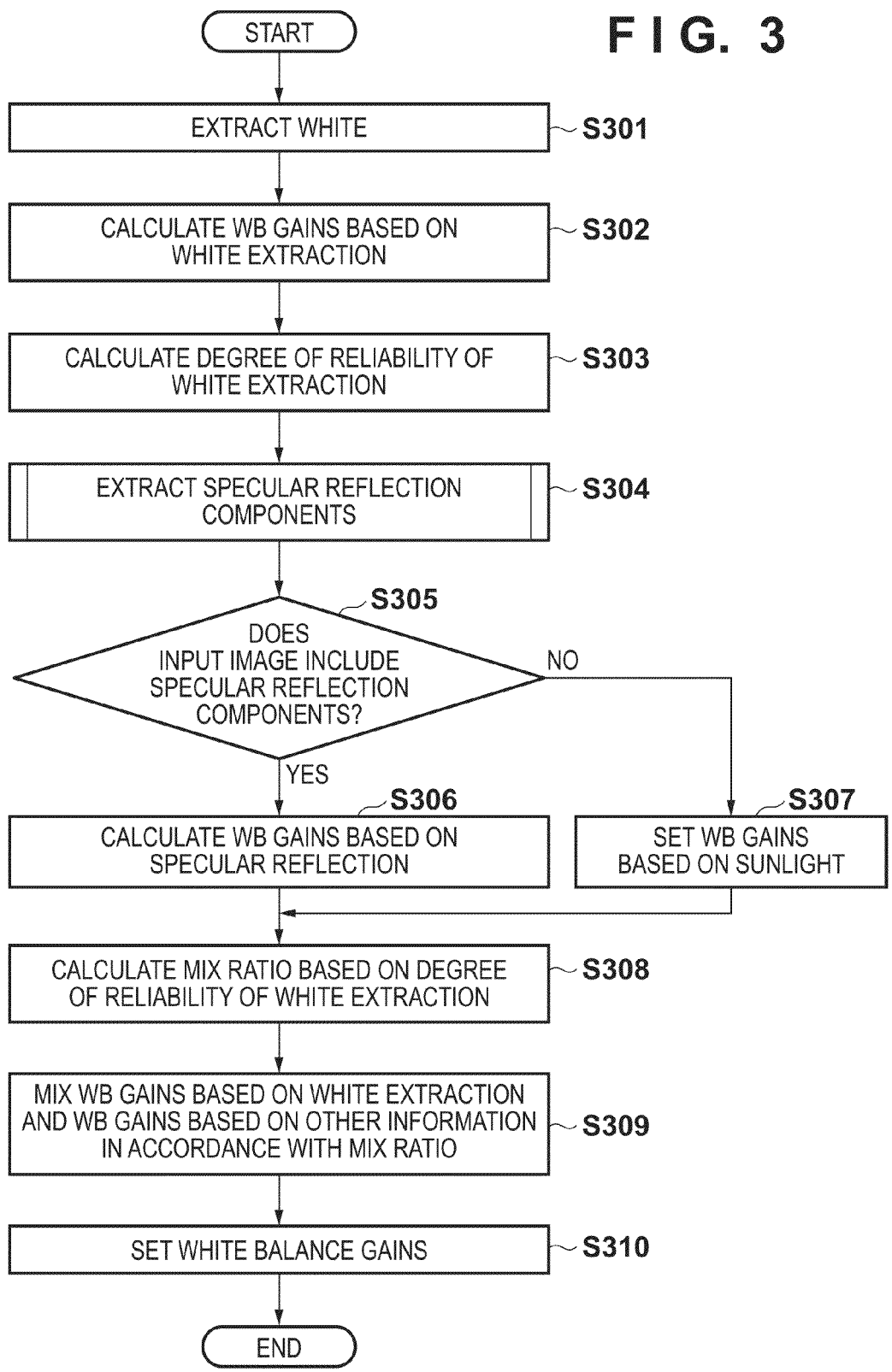

F I G. 4A
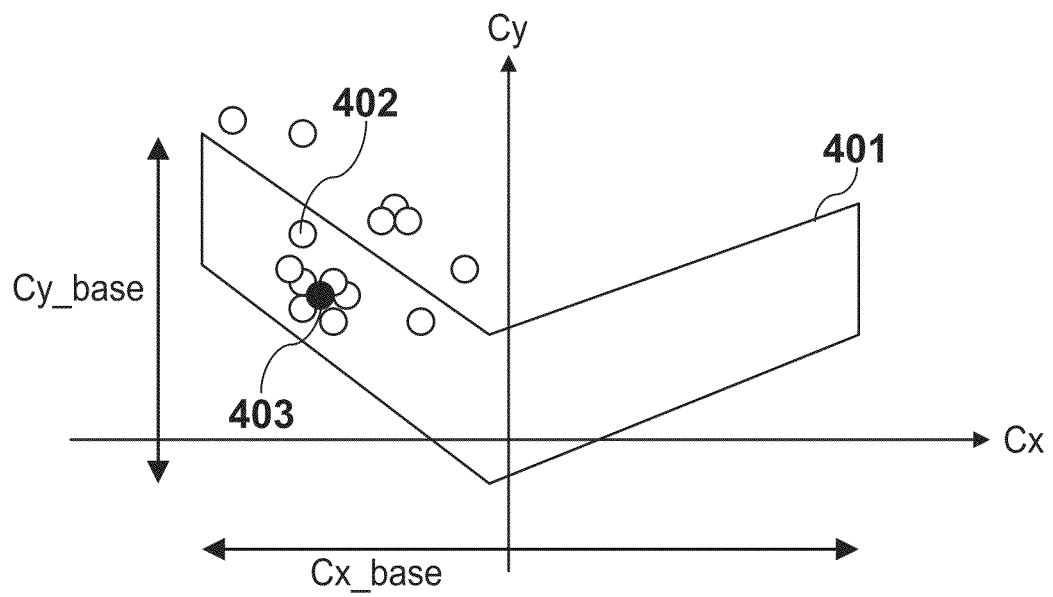
F I G. 4B
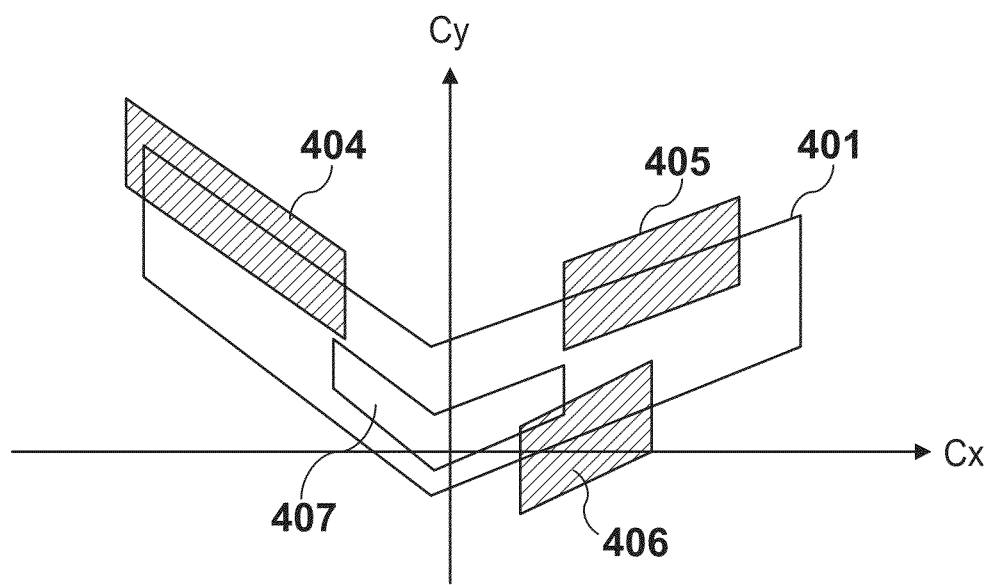

FIG. 8A

| | BLOCK 1 | BLOCK 2 | BLOCK 3 | BLOCK 4 | ... | BLOCK 64 |
|---|---|---|---|---|---|---|
| SUM OF DIFFERENCES sumS | R1 = XXX<br>G1 = XXX<br>B1 = XXX | R2 = XXX<br>G2 = XXX<br>B2 = XXX | R3 = XXX<br>G3 = XXX<br>B3 = XXX | R4 = XXX<br>G4 = XXX<br>B4 = XXX | ... | R64 = XXX<br>G64 = XXX<br>B64 = XXX |
| COUNT VALUE countS | countS1 = 2312 | countS2 = 981 | countS3 = 53 | countS4 = 387 | ... | countS64 = 17 |

FIG. 8B

| | BLOCK 1 | BLOCK 2 | BLOCK 3 | BLOCK 4 | ... | BLOCK 64 |
|---|---|---|---|---|---|---|
| SUM OF DIFFERENCES sumS | R1 = XXX<br>G1 = XXX<br>B1 = XXX | R2 = XXX<br>G2 = XXX<br>B2 = XXX | R3 = XXX<br>G3 = XXX<br>B3 = XXX | R4 = XXX<br>G4 = XXX<br>B4 = XXX | ... | R64 = XXX<br>G64 = XXX<br>B64 = XXX |
| DIFFERENCE COUNT VALUE countS | countS1 = 2312 | countS2 = 981 | countS3 = 53 | countS4 = 387 | ... | countS64 = 17 |
| SUM OF EDGES sumE | E1 = XXX | E2 = XXX | E3 = XXX | E4 = XXX | ... | E64 = XXX |
| EDGE COUNT VALUE countE | countE1 = 10 | countE2 = 1039 | countE3 = 23 | countE4 = 429 | ... | countE64 = 826 |

IMAGE PROCESSING APPARATUS AND CONTROL METHOD THEREFOR

CROSS REFERENCE TO RELATED APPLICATIONS

This application is a continuation of U.S. patent application Ser. No. 13/922,525 filed on Jun. 20, 2013, which claims the benefit of and priority to Japanese Patent Application No. 2012-141466, filed on Jun. 22, 2012, each of which are hereby incorporated by reference herein in their entirety.

BACKGROUND OF THE INVENTION

1. Field of the Invention

The present invention relates to an image processing apparatus and a control method therefor, and in particular to a technique to estimate an illuminant color from an image.

2. Description of the Related Art

Conventionally, most digital cameras have an automatic white balance (AWB) control function whereby the white balance is adjusted in accordance with the output from an image sensor without using an external sensor. For example, Japanese Patent Laid-Open No. 5-64219 discloses a method for adjusting the white balance in accordance with the output from an image sensor. This method extracts a color that is considered to be white (achromatic) from an input image and calculates a white balance gain that renders the extracted color white.

Another known method is to use a bicolor light reflection model whereby the object light of an object is separated into specular reflection components and diffuse reflection components.

Furthermore, Japanese Patent No. 4447520 discloses a method for identifying an illuminant color that illuminates an object by calculating a difference between adjacent pixels that vary in brightness. This method is based on a principle that components of the illuminant color are extracted by calculating a difference between a high-luminance first pixel (including both diffuse reflection components that reflect the object color and specular reflection components that reflect the illuminant color) and a pixel that has lower luminance than the first pixel (diffuse reflection components that include only the object color).

More specifically, a difference between the RGB value of the high-luminance first pixel and the RGB value of a second pixel that has lower luminance than the first pixel is calculated. As the resultant difference RGB value has the same vector components as the illuminant color, a white balance gain can be calculated based on the component ratio of the difference RGB value.

When an image does not include any white object or includes many objects that are close to but are not white, the method described in Japanese Patent Laid-Open No. 5-64219 lowers the accuracy of estimation of the illuminant color, that is to say, the accuracy of adjustment of the white balance.

Similarly, the method described in Japanese Patent No. 4447520 lowers the accuracy of adjustment of the white balance for images with a small luminance difference (dynamic range).

SUMMARY OF THE INVENTION

The present invention has been made in view of the above problem accompanying conventional techniques, and aims to provide an image processing apparatus and a control method therefor that allow obtaining accurate white balance gains by accurately estimating the illuminant colors of various objects in an image.

According to one aspect of the present invention, there is provided an image processing apparatus comprising: an extraction unit that extracts, from an input image, pixels having colors that are included in a predetermined extraction range in a predetermined color space; a first obtainment unit that obtains first white balance gains corresponding to the input image based on values of the extracted pixels; a component extraction unit that extracts specular reflection components included in the input image; a second obtainment unit that obtains second white balance gains corresponding to the input image based on the extracted specular reflection components; and a third obtainment unit that obtains third white balance gains used for the input image based on the first white balance gains and on the second white balance gains.

According to another aspect of the present invention, there is provided a method for controlling an image processing apparatus, the method comprising: an extraction step of extracting, from an input image, pixels having colors that are included in a predetermined extraction range in a predetermined color space; a first obtainment step of obtaining first white balance gains corresponding to the input image based on values of the extracted pixels; a specular reflection component extraction step of extracting specular reflection components included in the input image; a second obtainment step of obtaining second white balance gains corresponding to the input image based on the extracted specular reflection components; and a third obtainment step of obtaining third white balance gains used for the input image based on the first white balance gains and on the second white balance gains.

Further features of the present invention will become apparent from the following description of exemplary embodiments with reference to the attached drawings.

BRIEF DESCRIPTION OF THE DRAWINGS

FIG. 3 is a flowchart of white balance gain calculation processing according to the first embodiment of the present invention.

FIGS. 4A and 4B show examples of a white extraction range according to embodiments of the present invention.

FIGS. 8A and 8B schematically show forms of storage of differences, count values, and the like according to embodiments of the present invention.

DESCRIPTION OF THE EMBODIMENTS

Exemplary embodiments of the present invention will now be described in detail in accordance with the accompanying drawings. While a digital camera will be described in the following embodiments as one example of an image processing apparatus according to the present invention, configurations related to image capture are not indispensable in the present invention, and the present invention can be implemented using any apparatus capable of obtaining image data.

First Embodiment

Figure 1:
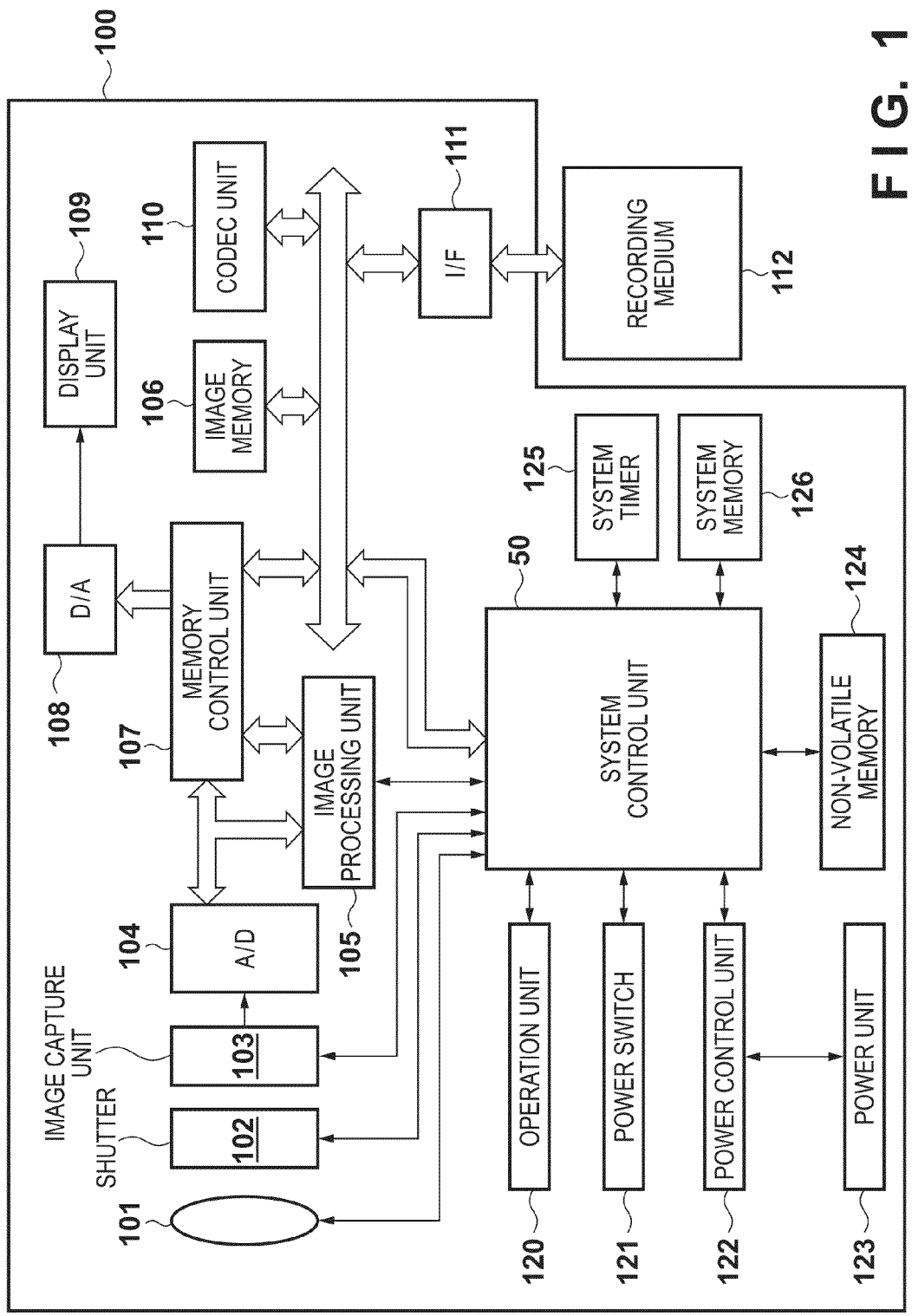
FIG. 1 is a block diagram showing an example of a configuration of a digital camera which is one example of an image processing apparatus according to embodiments of the present invention.

FIG. 1 is a block diagram showing an example of a configuration of a digital camera 100 according to the first embodiment of the present invention.

Referring to FIG. 1, a lens group 101 includes a focus lens and serves as a zoom lens. A shutter 102 that has functions of a diaphragm is arranged between the lens group 101 and an image capture unit 103. The image capture unit 103 includes an image sensor that converts an optical image formed by the lens group 101 on an imaging surface into electrical signals in units of pixels. Representative examples of the image sensor include a CCD image sensor and a CMOS image sensor. An A/D converter 104 converts analog signals output from the image capture unit 103 into digital signals (image data).

An image processing unit 105 applies various types of image processing, such as color interpolation (demosaicing), white balance adjustment, γ correction, edge enhancement, noise reduction and color correction, to the image data output from the A/D converter 104. An image memory 106 temporarily stores image data. A memory control unit 107 controls the operations of reading from and writing to the image memory 106. A D/A converter 108 converts image data into analog signals. A display unit 109 includes a display device such as an LCD and an organic EL display, and displays, for example, various types of GUI, live-view images, and images that have been read from a recording medium 112 and reproduced. A codec unit 110 codes image data stored in the image memory 106 using a predetermined method so as to record the same in a recording medium, and decodes coded image data included in image files for display and similar purposes.

An interface (I/F) 111 mechanically and electrically connects the attachable/detachable recording medium 112 to the digital camera 100. Examples of the recording medium 112 include a semiconductor memory card and a card-type hard disk drive. A system control unit 50 may be a programmable processor such as a CPU and an MPU. The system control unit 50 realizes the functions of the digital camera 100 including the later-described light source estimation processing by controlling necessary blocks and circuits through execution of programs recorded in a non-volatile memory 124, a built-in non-volatile memory, and the like.

Note that each of functional blocks such as a "unit" and a "section" in the drawings can be realized by hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be implemented as a single hardware entity.

An operation unit 120 represents a collection of buttons, switches, and the like via which a user inputs various types of instructions to the digital camera 100. Note that a power switch 121, which is one of a group of switches included in the operation unit 120, is illustrated as a separate block for the sake of convenience. A power control unit 122 is constituted by a battery detection circuit, a DC-to-DC converter, a switch circuit for switching between blocks to which current is supplied, and the like. The power control unit 122 detects, for example, information indicating whether or not a power unit 123 is attached, the type of the power unit 123, the remaining power level of the power unit 123, and the like. Note that the power unit 123 is a rechargeable battery. The power control unit 122 also controls the DC-to-DC converter based on the result of detection regarding the power unit 123 and on the instructions from the system control unit 50 so as to supply necessary voltage to the constituent elements of the digital camera 100, including the recording medium 112, for a necessary period of time.

The non-volatile memory 124 may be, for example, an electrically erasable and recordable memory such as an EEPROM. Various types of setting values and GUI data are recorded in the non-volatile memory 124. When the system control unit 50 is an MPU or a CPU, programs are also recorded in the non-volatile memory 124.

A system timer 125 measures time periods used for various types of control and time of a built-in clock. A system memory 126 is, for example, a volatile memory that is used to store constants and variables for the operations of the system control unit 50, and to deploy programs and the like read from the non-volatile memory 124.

A description is now given of the operations of the digital camera 100 during image capture.

For example, the image capture unit 103 photoelectrically converts an image of an object that is formed by the lens group 101 on an imaging surface while the shutter 102 is open using the image sensor, and outputs the result of the photoelectric conversion to the A/D converter 104 as analog image signals. The A/D converter 104 converts the analog image signals output from the image capture unit 103 into digital image signals (image data) and outputs the digital image signals to the image processing unit 105.

The image processing unit 105 applies various types of image processing, such as color interpolation (demosaicing), γ correction, edge enhancement, noise reduction and color correction, to image data from the A/D converter 104 or to image data from the memory control unit 107.

The image processing unit 105 also executes predetermined arithmetic processing related to luminance, contrast, and the like using the image data obtained through image capture. The system control unit 50 performs ranging control and exposure control based on the result of the arithmetic processing. In the above manner, the digital camera 100 according to the present embodiment executes through-the-lens (TTL) autofocus (AF) processing and automatic exposure (AE) processing. The image processing unit 105 further estimates an illuminant color that illuminated the object during image capture using the image data obtained through image capture, and performs AWB adjustment based on the estimated illuminant color. Specifics of processing for estimating the illuminant color will be described later.

The image data output from the image processing unit 105 is written to the image memory 106 via the memory control unit 107. The image memory 106 stores image data output from the image capture unit 103 and image data to be displayed on the display unit 109.

The D/A converter 108 converts data for image display stored in the image memory 106 into analog signals and provides the display unit 109 with the analog signals. The display unit 109 displays contents on the display device such as an LCD in accordance with the analog signals from the D/A converter 108.

The codec unit 110 codes image data recorded in the image memory 106 based on the standards such as JPEG and MPEG. The system control unit 50 generates image files by applying predetermined headers and the like to the coded image data and records the generated image files in the recording medium 112 via the interface 111.

In general, current digital cameras capture a video and keep displaying the captured video on the display unit 109 during an image capture standby state. That is to say, the display unit 109 functions as an electronic viewfinder (EVF). At this time, the shutter 102 is left open, and image capture is performed at a rate of, for example, 30 FPS using a so-called electronic shutter included in the image capture unit 103.

When a shutter button included in the operation unit 120 is pressed halfway down, the aforementioned AF control and AE control are performed. When the shutter button is pressed all the way down, main image capture is performed, that is to say, a still image is captured and recorded in the recording medium 112. When video capture is instructed via a video capture button and the like, recording of a video into the recording medium 112 is started.

Figure 2:
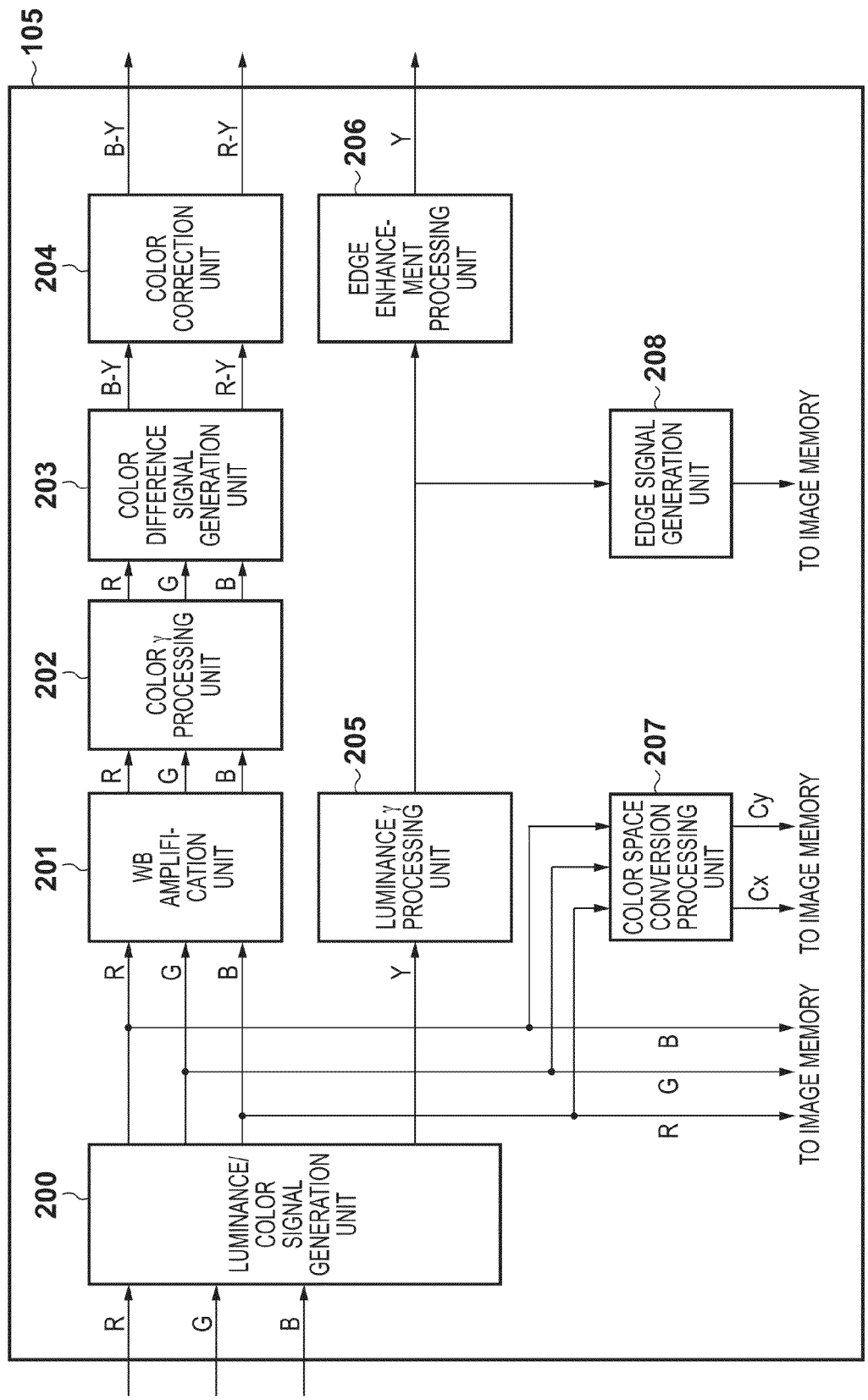
FIG. 2 is a block diagram showing an example of a configuration of an image processing unit shown in FIG. 1.

FIG. 2 is a block diagram showing an example of a functional configuration of the image processing unit 105.

Image data output from the A/D converter 104 shown in FIG. 1 is input to a luminance/color signal generation unit 200. Image data holds values that each correspond to a different one of color components constituting a color filter provided in the image sensor. When an ordinary primary-color filter with the Bayer arrangement is used, image data is constituted by data of R, G and B pixels.

The luminance/color signal generation unit 200 applies demosaic processing to such image data and generates a luminance signal Y and color signals R, G and B for each pixel. The luminance/color signal generation unit 200 then outputs the generated color signals R, G and B to a white balance (WB) amplification unit 201, and the generated luminance signal Y to a luminance γ processing unit 205. The luminance/color signal generation unit 200 also outputs the color signals R, G and B as image data (RGB) to the image memory 106 via the memory control unit 107.

The color signals R, G and B generated by the luminance/color signal generation unit 200 are also input to a color space conversion processing unit 207. The color space conversion processing unit 207 converts the color signals R, G and B into color space signals Cx and Cy using the following equations, and outputs the image signals Cx and Cy as image data (CxCy) to the image memory 106 via the memory control unit 107.

$$Cx=(R-B)/Y$$

$$Cy=(R+B-2G)/Y$$

$$Y=(R+G+B)/2$$

The WB amplification unit 201 adjusts the white balance by applying gains to the color signals R, G and B based on the white balance gain values that are calculated by the system control unit 50 through the later-described processing. The color γ processing unit 202 applies gamma correction to the color signals R, G and B. A color difference signal generation unit 203 generates color difference signals R-Y and B-Y from the color signals R, G and B, and outputs the generated color difference signals R-Y and B-Y to a color correction unit 204. The color correction unit 204 adjusts hue and saturation by, for example, applying gains to the color difference signals R-Y and B-Y. The color correction unit 204 then outputs the corrected color difference signals R-Y and B-Y to the image memory 106 via the memory control unit 107.

On the other hand, the luminance γ processing unit 205 applies gamma correction to the luminance signal Y and outputs the resultant luminance signal Y to an edge enhancement processing unit 206 and an edge signal generation unit 208. The edge enhancement processing unit 206 applies edge enhancement processing to the luminance signal Y and outputs the resultant luminance signal Y to the image memory 106 via the memory control unit 107. The luminance signal Y output from the edge enhancement processing unit 206 and the color difference signals R-Y and B-Y output from the color correction unit 204 are coded by the codec unit 110 and ultimately recorded in the recording medium 112.

The edge signal generation unit 208 bandpass filters the image output from the luminance γ processing unit 205, thereby generating an edge signal of the image. The edge signal generation unit 208 then outputs the generated edge image signal to the image memory 106 via the memory control unit 107. Note that the edge signal generation unit 208 is not required in the first embodiment.

A description is now given of light source estimation processing according to the present embodiment with reference to the flowchart of FIG. 3. In the light source estimation processing, the system control unit 50 estimates components of an illuminant color from the signals output from the luminance/color signal generation unit 200 in the image processing unit 105 to the image memory 106.

Note that before executing the processing shown in FIG. 3, the system control unit 50 obtains the image data (RGB) and the image data (CxCy) from the image memory 106 and deploys them to the system memory 126.

In S301, the system control unit 50 extracts signals that are close to white (an achromatic color) from an input image. This process is explained below with reference to FIGS. 4A and 4B. FIG. 4A shows a CxCy color space. In FIG. 4A, a white extraction range 401 represents a color region that is considered to be white, and white circles 402 each represent image data (CxCy). Cx_base and Cy_base represent the maximum dimensions of the white extraction range 401 in the horizontal and vertical directions, respectively.

With respect to all pixels in the input image, the system control unit 50 determines whether or not each pixel has a color included in the white extraction range 401. Pixel values (Cx, Cy) included in the white extraction range are added to a buffer which may be, for example, the system memory 126. Furthermore, the system control unit 50 counts the number of pixels with pixel values (Cx, Cy) included in the white extraction range (white pixel count).

The system control unit 50 also assesses the extent to which the image includes colors that are likely to be extracted as white (achromatic) objects by error. This is explained below with reference to FIG. 4B. As with FIG. 4A, FIG. 4B shows a relationship between the CxCy color space and the white extraction range 401. In FIG. 4B, pixels in color regions 404, 405 and 406 may be white (achromatic) or chromatic. For example, a pixel corresponding to a pale blue object color under the sunlight and a pixel corresponding to an achromatic object in the shade may both be included in the color region 404. The system control unit 50 counts the number of such pixels that have colors included in the color regions 404, 405 and 406 and therefore may be considered to be white (achromatic) even though they are not white. Note that it is possible to set in advance the regions in which the colors that may be extracted as white (achromatic) objects by error are distributed.

In S302, the system control unit 50 calculates a white balance gain based on the result of extraction in S301. First, the system control unit 50 calculates a white balance gain by dividing the sum of the extracted pixel values (Cx, Cy) by the white pixel count value. As a result of this calculation, the average of pixel values with colors included in the white extraction range 401 is obtained. A black circle 403 shown in FIG. 4A represents an example of the calculated average value.

Next, the system control unit 50 converts the color space of the calculated average value (Cx, Cy) into a value of the RGB color space. This RGB value is referred to as a white extraction average RGB value (wR, wG, wB).

The system control unit 50 then calculates white balance gains based on the white extraction average RGB value (wR, wG, wB) (first white balance gains). Provided that the white balance gain for G, i.e. wG-Gain is a predetermined fixed value, the white balance gains for R and B (wR-Gain and wB-Gain) are calculated using the following equations.

$$wR\text{-Gain} = (wG/wR) * wG\text{-Gain}$$

$$wB\text{-Gain} = (wG/wB) * wG\text{-Gain}$$

That is to say, wR-Gain and wB-Gain represent white balance gains based on white extraction (first white balance gains).

Figure 5A:
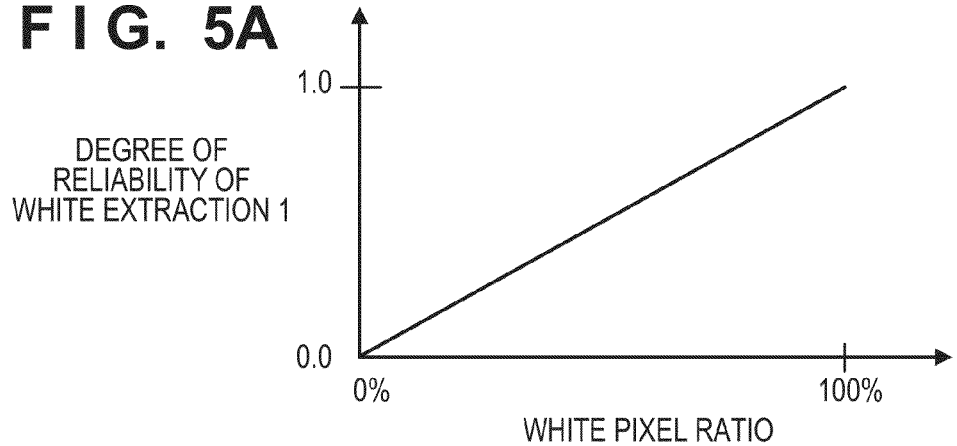
FIGS. 5A to 5C show examples of the characteristics of degrees of reliability of white extraction 1 to 3 according to embodiments of the present invention.
Figure 5B:
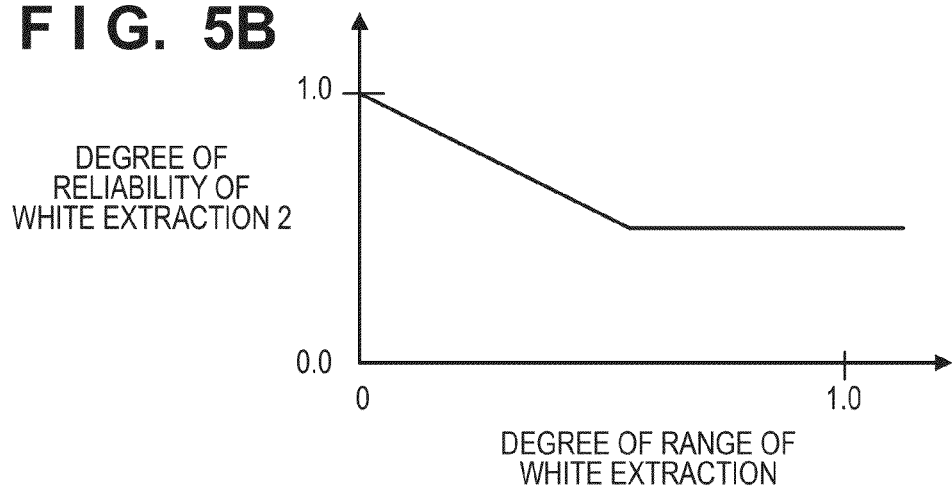
Figure 5C:
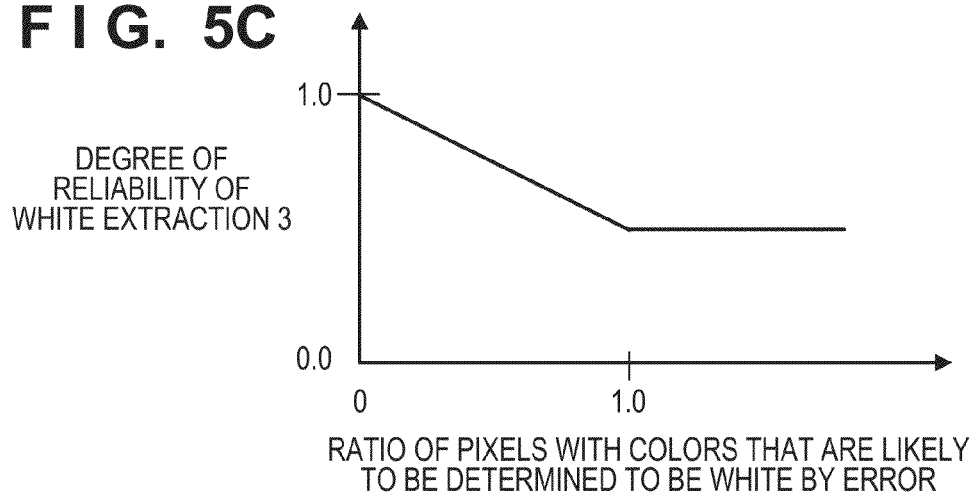

In S303, the system control unit 50 calculates a degree of reliability of the white balance gains based on white extraction (a degree of reliability of white extraction). A description is now given of a method for calculating the degree of reliability of white extraction with reference to FIGS. 5A to 5C. The degree of reliability of white extraction is calculated by summing degrees of reliability of white extraction 1 to 3. First, a method for calculating the degrees of reliability of white extraction 1 to 3 will be explained.

(Calculation of Degree of Reliability of White Extraction 1)

The degree of reliability of white extraction 1, which is a first degree of reliability of white extraction, depends on a ratio of the number of pixels with colors included in the white extraction range 401 to the total number of pixels included in the image. The system control unit 50 calculates the percentage of the white pixel count obtained in S301 out of the number of pixels included in the input image as a white pixel ratio. Then, the system control unit 50 calculates the degree of reliability of white extraction 1 based on a relationship between the white pixel ratio and the degree of reliability of white extraction 1 exemplarily shown in FIG. 5A. In the present embodiment, the degree of reliability of white extraction 1 linearly increases as the white pixel ratio increases.

(Calculation of Degree of Reliability of White Extraction 2)

The degree of reliability of white extraction 2, which is a second degree of reliability of white extraction, is calculated based on a degree of range of distribution of pixel values with colors included in the white extraction range 401. More specifically, a degree of range of white distribution is calculated based on a difference between the minimum and maximum values of the pixel values (Cx, Cy) included in the white extraction range 401 detected from the input image. In S301, the system control unit 50 detects the following values from the pixel values included in the white extraction range 401: the maximum and minimum values of Cx, i.e. Cx_max and Cx_min, and the maximum and minimum values of Cy, i.e. Cy_max and Cy_min. Then, the system control unit 50 calculates the degrees of range of white extraction in the Cx and Cy directions as follows.

Degree of range of white extraction in $Cx$ direction=
$(Cx\_max - Cx\_min)/Cx\_base$ Degree of range of white extraction in $Cy$ direction=
$(Cy\_max - Cy\_min)/Cy\_base$ Note that Cx_base and Cy_base represent the maximum dimensions of the white extraction range 401 as shown in FIG. 4A.

Thereafter, the system control unit 50 adds the calculated degrees of range of white extraction in the Cx and Cy directions. The result of the addition is used as a degree of range of white extraction. The system control unit 50 then calculates the degree of reliability of white extraction 2 based on a relationship between the degree of range of white extraction and the degree of reliability of white extraction 2 exemplarily shown in FIG. 5B. In the present embodiment, the degree of reliability of white extraction 2 first linearly decreases and then remains at a constant value as the degree of range of white extraction increases.

When the pixel values extracted as white pixels are widely distributed within the white extraction range 401, it means that the extracted colors vary to a great extent and are not stable. That is to say, when a degree of range of colors is high, a degree of reliability of white extraction is low.

(Calculation of Degree of Reliability of White Extraction 3)

The degree of reliability of white extraction 3, which is a third degree of reliability of white extraction, is calculated based on a ratio of the number of pixels with colors that are likely to be determined to be white by error to the number of pixels that have been determined to be white. As mentioned earlier, in S301, the system control unit 50 counts the number of pixels with colors that are included in the color regions 404 to 406 and are therefore likely to be determined to be white by error. Then, the system control unit 50 calculates the degree of reliability of white extraction 3 based on a relationship between: a ratio of the number of pixels with colors that are included in the color regions 404 to 406 and are therefore likely to be determined to be white by error to the number of pixels with colors included in the white extraction range 401; and the degree of reliability of white extraction 3. Note that this relationship is exemplarily shown in FIG. 5C. The degree of reliability of white extraction 3 first linearly decreases and then remains at a constant value as the ratio of the pixels with colors that are likely to be determined to be white by error increases.

When the ratio of the pixels with colors that are likely to be determined to be white by error is large, it means that there are many vague colors that may or may not be determined to be white, thereby lowering the reliability of determination. This is why the degree of reliability of white extraction is low when there are many pixels with colors that are likely to be determined to be white by error.

Once the degrees of reliability of white extraction 1 to 3 have been calculated in the above manner, the system control unit 50 calculates the final degree of reliability of white extraction by multiplying the degrees of reliability of white extraction 1 to 3 as follows.

Degree of reliability of white extraction=degree of reliability of white extraction 1×degree of reliability of white extraction 2×degree of reliability of white extraction 3

Returning to FIG. 3, the system control unit 50 extracts specular reflection components in S304.

Specifics of specular reflection component extraction processing in S304 are described below with reference to the flowchart of FIG. 6.

Figure 6:
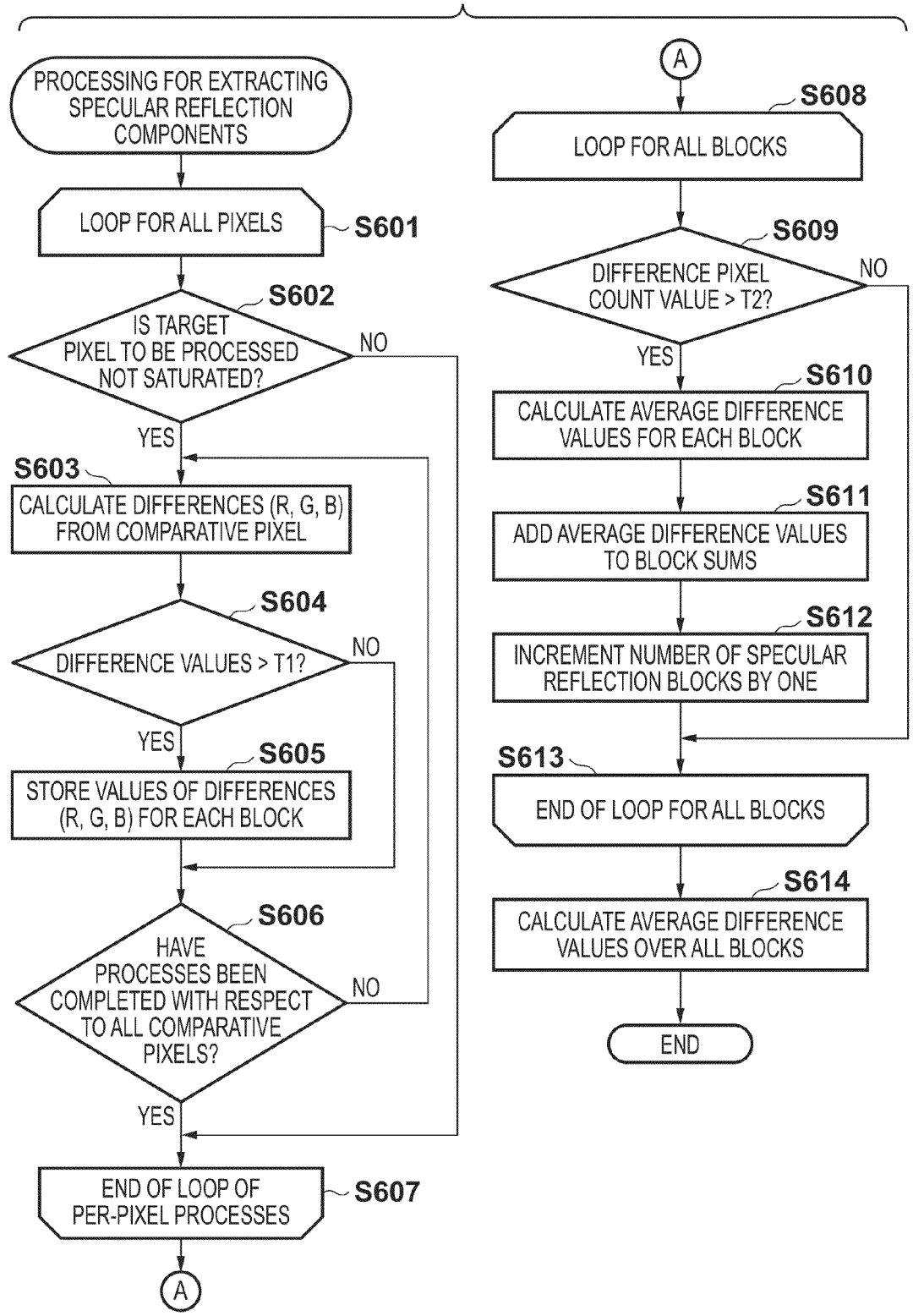
FIG. 6 is a flowchart of specular reflection component extraction processing in S304 of FIG. 3.

In FIG. 6, S601 and S607 indicate that the processes of S602 to S606 are executed with respect to all pixels while raster scanning each target pixel.

In S602, the system control unit 50 checks whether a target pixel to be processed is not saturated. More specifically, the system control unit 50 compares each of the RGB components with a predetermined threshold. If any of the RGB components is larger than the threshold, the system control unit 50 determines that the current target pixel is saturated, skips the process for the current target pixel, and checks the saturation of the next pixel. On the other hand, if all of the RGB components are smaller than or equal to the threshold, the system control unit 50 determines that the current target pixel is not saturated and proceeds to the process of S603.

Figure 7A:
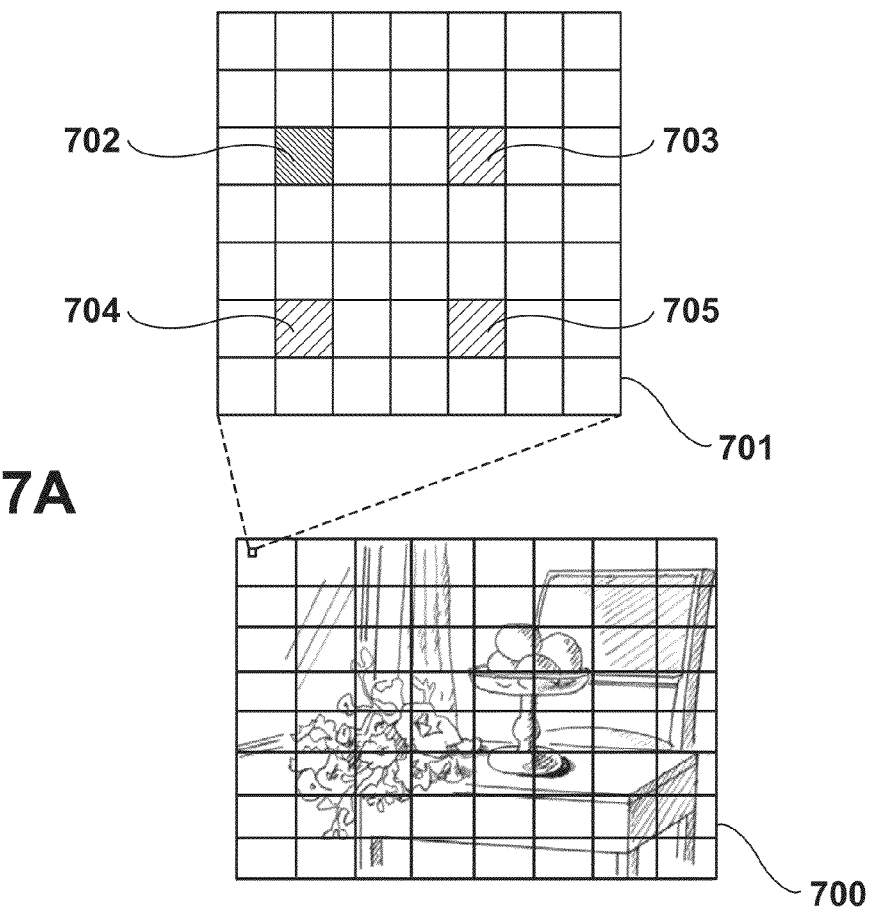
FIGS. 7A and 7B show examples of an input image according to the first embodiment of the present invention.

In S603, the system control unit 50 calculates differences between the target pixel and a comparative pixel. A description is now given of the target pixel and comparative pixel with reference to FIG. 7A. In FIG. 7A, 700 shows an input image, and 701 schematically shows an enlargement of a part of the input image 700. Referring to 701, a mesh grid represents borders between pixels. In FIG. 7A, 702 shows a target pixel to which the current process is to be applied. The processing of FIG. 6 is executed with respect to all pixels while sequentially raster scanning the position of the target pixel 702. Also, 703, 704 and 705 show comparative pixels corresponding to the target pixel 702. In the present embodiment, a plurality of pixels that are located away from the target pixel 702 by a predetermined distance (number of pixels) in predetermined directions are used as comparative pixels.

A positional relationship that the target pixel and comparative pixels should satisfy can be determined in advance. Basically, pixels at a plurality of positions adjacent to the target pixel are used as the comparative pixels. In the example of FIG. 7A, provided that the target pixel is at the upper left corner of a block composed of 4×4 pixels, pixels at the remaining three corners are used as the comparative pixels. If a distance between the target pixel and comparative pixels is too small, then there is a high possibility that differences between the pixels are small. Conversely, if a distance between the target pixel and comparative pixels is too large, then there is a high possibility that the pixels do not correspond to the same object. For this reason, the distance is experimentally determined to fall within a range of, for example, approximately several to ten pixels. Note that a positional relationship between the target pixel and comparative pixels may be changed as appropriate in the case where, for example, the target pixel is at the corner of the input image.

In S603, the system control unit 50 calculates differences between the target pixel 702 and the comparative pixel 703. More specifically, the system control unit 50 calculates differences (subR, subG, subB) between the RGB values (R1, G1, B1) of the target pixel 702 and the RGB values (R2, G2, B2) of the comparative pixel 703 for respective color components.

In S604, the system control unit 50 determines whether or not the magnitude S of the differences (subR, subG, subB) calculated in S603 is larger than a predetermined threshold T1 (T1<S). The magnitude S of the differences (subR, subG, subB) is calculated using the following equation.

$$S=\sqrt{\{(\text{sub}R)^2+(\text{sub}G)^2+(\text{sub}B)^2\}}$$

The system control unit 50 proceeds to the process of S605 when the magnitude S of the differences is larger than the threshold T1, and to the process of S606 when the magnitude S of the differences is smaller than or equal to the threshold T1.

In S605, the system control unit 50 stores (adds) the differences (subR, subG, subB) between the target pixel and comparative pixel in the system memory 126 and calculates a sum of differences sumS. FIG. 8A shows an exemplary form of storage of the differences (subR, subG, subB). In the present embodiment, when the magnitude S of the differences is larger than the threshold T1, the sum of differences sumS is obtained by summing the differences (subR, subG, subB) for each block to which the target pixel belongs, as shown in FIG. 8A.

Note that the blocks mentioned herein denote divided regions of an input image. FIG. 7A shows an example in which the input image 700 is divided into 64 regions, that is to say, 8 regions in the horizontal direction and 8 regions in the vertical direction. With respect to each divided region of an input image, the differences (subR, subG, subB) thus calculated for the pixels included in the divided region are summed. The sum of the differences is a difference value representing the corresponding block (block difference value). Furthermore, each time the differences (subR, subG, subB) are added, a count value CountS associated with the sum of differences sumS is incremented by one. That is to say, the count value CountS denotes the number of difference values used to calculate the block difference value.

Note that the purpose of summing the differences (subR, subG, subB) only when the magnitude S of the differences is larger than the threshold T1 in S604 and S605 is to extract only the difference values that are considered to show the characteristics of the illuminant color to a great extent. This is explained below in more detail with reference to FIGS. 7B, 9A and 9B.

Figure 7B:
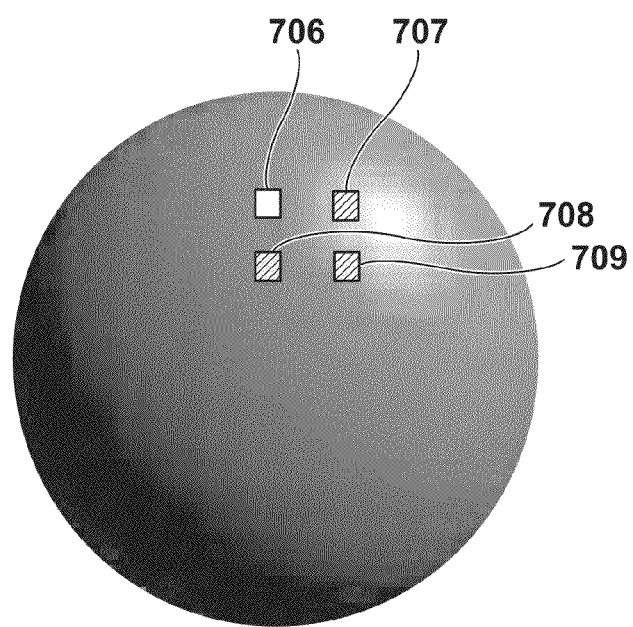

FIG. 7B shows an image of an object exhibiting specular reflection, a target pixel to be processed 706, and comparative pixels 707 to 709. It is assumed here that the high-luminance comparative pixels 707 and 709 include a relatively large number of specular reflection components, while the target pixel 706 and the comparative pixel 708 are composed mostly of diffuse reflection components.

Figure 9A:
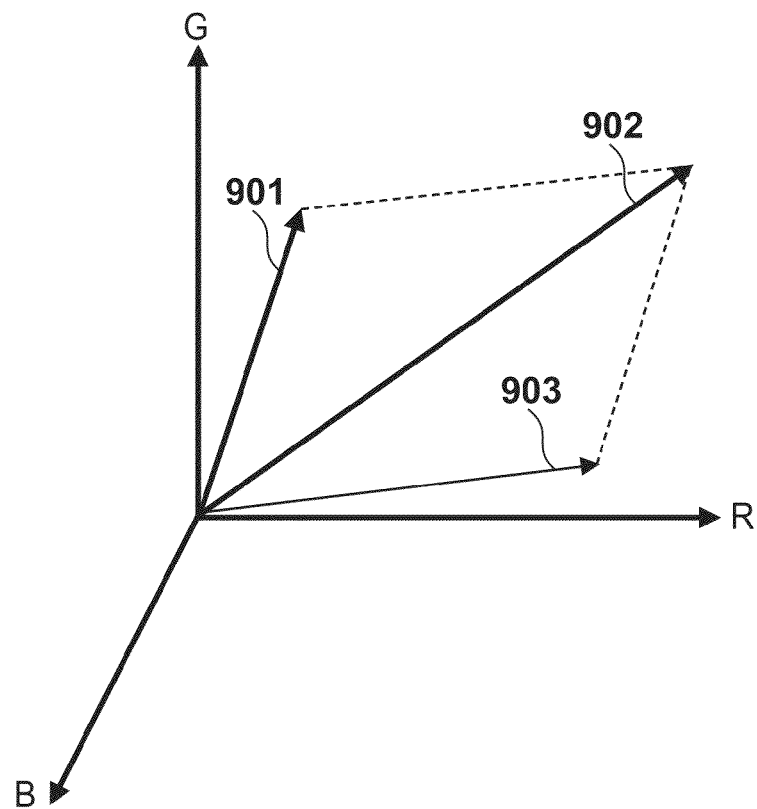
FIGS. 9A and 9B illustrate a method for estimating an illuminant color according to the present invention.

FIG. 9A schematically shows an exemplary relationship between specular reflection components and diffuse reflection components of pixels in an RGB color space. In an RGB space, RGB values of a pixel can be expressed as a vector from the origin to coordinates corresponding to the RGB values. A vector 901 corresponds to the case where the RGB values are composed only of the object color (diffuse reflection components). A vector 902 corresponds to the case where the RGB values are composed of the object color (diffuse reflection components) and the illuminant color (specular reflection components). A vector 903, which shows the RGB values of a desired illuminant color (specular reflection components), can be obtained as a difference vector showing a difference between the vectors 902 and 901. As the origins of these vectors are all located at the origin of the coordinate system, the RGB values calculated as a difference between sets of coordinates serve as the RGB values of the light source in practice. That is to say, a difference between the RGB values of a pixel composed only of the object color and the RGB values of a pixel composed of the object color and the illuminant color can be obtained as the RGB values of the illuminant color. In the example of FIG. 7B, a difference between the RGB values of the target pixel 706 and the RGB values of the comparative pixel 707 or 709 is calculated as the estimated RGB values of the illuminant color.

Figure 9B:
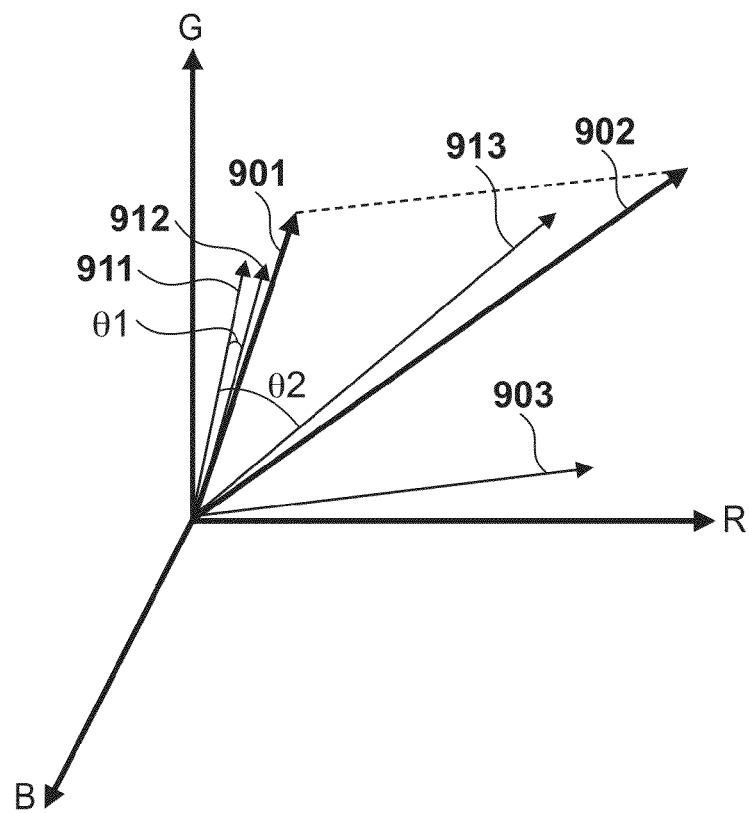

Meanwhile, diffuse reflection components are dominant in both of the target pixel 706 and the comparative pixel 708 in FIG. 7B. That is to say, the RGB values of these pixels are similar to the vector 901 in the example of FIG. 9A. For example, referring to FIG. 9B, provided that vectors 911 and 912 represent the RGB values of the target pixel 706 and the RGB values of the comparative pixel 708, respectively, the differences between the RGB values have extremely small values. Although not shown in the figures, both of the comparative pixels 707 and 709 similarly include diffuse reflection components and specular reflection components, and the RGB values thereof are expressed as vectors that are similar to the vector 902. In this case also, the differences between the RGB values have extremely small values.

Provided that the RGB values of the comparative pixel 707 are expressed as a vector 913 in FIG. 9B, a difference between the vector 911 corresponding to the RGB values of the target pixel 706 and the vector 913 corresponding to the RGB values of the comparative pixel 707 is large. It is desired that this difference be extracted as it represents a vector similar to the RGB values of the illuminant color.

When the magnitude S of the differences between RGB values of pixels is small in the above manner, it is considered that these pixels are likely to include similar reflection components and there is a weak association between the difference values and the characteristics of the light source. Therefore, such differences are not used in estimation of the illuminant color in the present embodiment. For this reason, the threshold T1 is set as described above, and the sum of differences sumS (R, G, B) is calculated by summing the differences (subR, subG, subB) in the system memory 126 only when the magnitude S of the differences is larger than the threshold T1.

The system control unit 50 calculates the sum of differences sumS for each of 64 blocks. Note that the sums of differences for block 1, block 2, . . . , block 64 are respectively sumS1 (R1, G1, B1), sumS2 (R2, G2, B2), . . . , sumS64 (R64, G64, B64). Also, each time the differences are added to the sum of differences sumS, the system control unit 50 increments a difference count value countS by one. FIG. 8A shows the sums of differences sumS1 to sumS64 and the difference count values countS for the blocks.

Returning to FIG. 6, in S606, the system control unit 50 checks whether or not the processes of S602 to S605 have been executed with respect to all the comparative pixels 703 to 705. As shown in FIG. 7A, in the present embodiment, there are one target pixel 702 and three comparative pixels 703, 704 and 705. Therefore, with respect to every target pixel to be processed, the differences are calculated (S603), and when the magnitude S of the differences is larger than the predetermined threshold T1, the differences (subR, subG, subB) are added to the system memory 126 and the difference count value is incremented by one.

The above-described processes of S602 to S606 are executed with respect to all pixels included in the input image while raster scanning each target pixel.

Once the difference values have been calculated with respect to all pixels included in the input image through the processes preceding S607, the system control unit 50 calculates an average difference value for each of the 8×8=64 blocks in S608 to S613.

First, in S609, the system control unit 50 refers to the difference count value countS of a target block to be processed and determines whether or not the difference count value countS is larger than a predetermined threshold T2. When the difference count value countS of the target block is larger than the threshold T2, the system control unit 50 determines that the target block includes specular reflection components and proceeds to the process of S610. On the other hand, when the difference count value countS of the target block is smaller than or equal to the threshold T2, the system control unit 50 determines that the target block does not include specular reflection components and proceeds to process the next block.

In S610, the system control unit 50 calculates average difference values (blkR, blkG, blkB). More specifically, the system control unit 50 divides the value of the sum of differences sumS by the difference count value countS for respective RGB components. As a result, average difference values (blkR, blkG, blkB) are obtained for the target block.

In S611, the system control unit 50 adds the average difference values (blkR, blkG, blkB) of the target block calculated in S610 to block sums (sumBlkR, sumBlkG, sumBlkB) in the system memory 126. The block sums are used to calculate the later-described average difference values of the entire image.

In S612, the system control unit 50 increments the number of specular reflection blocks blkCountS by one. The number of specular reflection blocks blkCountS denotes the number of blocks that have been determined to include specular reflection components out of the 64 blocks obtained by dividing the input image.

Once the system control unit 50 executes the above processes of S609 to 612 with respect to all of the 8×8=64 blocks, the system control unit 50 calculates the average difference values (aveR, aveG, aveB) of the entire input image in S614. More specifically, the system control unit 50 calculates the average difference values (aveR, aveG, aveB) of the entire input image by dividing each component of the block sums (sumBlkR, sumBlkG, sumBlkB) by the number of specular reflection blocks blkCountS. These average difference values (aveR, aveG, aveB) of the entire input image represent average values of the specular reflection components as described earlier with reference to FIG. 7B.

Returning to FIG. 3, in S305, the system control unit 50 determines whether or not the input image includes specular reflection components. More specifically, the system control unit 50 refers to the aforementioned number of specular reflection blocks blkCountS, and when the number of specular reflection blocks blkCountS is larger than or equal to a predetermined threshold, determines that the input image includes specular reflection components. The system control unit 50 proceeds to the process of S306 when it determines that the input image includes specular reflection components, and to the process of S307 when it determines that the input image does not include specular reflection components.

In S306, the system control unit 50 calculates white balance gains based on the specular reflection components (second white balance gains). Provided that the white balance gain for G, i.e. sG-Gain is a predetermined fixed value, the white balance gains for R and B, i.e. sR-Gain and sB-Gain are calculated using the following equations.

$$sR\text{-Gain}=(aveG/aveR)*sG\text{-gain}$$

$$sB\text{-Gain}=(aveG/aveB)*sG\text{-gain}$$

In S307, the system control unit 50 sets white balance gains based on the sunlight, which have been prepared in the non-volatile memory 124 in advance, as the white balance gains.

pG-Gain=G gain based on sunlight pR-Gain=R gain based on sunlight pB-Gain=B gain based on sunlight In S308, the system control unit 50 calculates a MIX ratio of white balance gains in accordance with the degree of reliability of white extraction calculated in S303. The MIX ratio of white balance gains denotes a ratio of mixture of white balance gains based on white extraction and white balance gains based on other information. In the present embodiment, the degree of reliability of white extraction calculated in S303 (0 to 1) is set as the MIX ratio of white balance gains. For example, when the aforementioned degree of reliability of white extraction is 0.8, 0.8 is set as the MIX ratio of white balance gains.

In S309, the system control unit 50 mixes the white balance gains based on the result of white extraction and the white balance gains based on other information in accordance with the MIX ratio of white balance gains calculated in S308. Note that the white balance gains based on other information denote the white balance gains based on specular reflection or the white balance gains based on the sunlight.

More specifically, when the system control unit 50 determines in S305 that the input image includes specular reflection components, the system control unit 50 mixes the white balance gains based on white extraction (wR-Gain, wG-Gain, wB-Gain) and the white balance gains based on specular reflection (sR-Gain, sG-Gain, sB-Gain). As shown in the following equations, the final white balance gains (R-Gain, G-gain, B-Gain) are calculated through weighted addition as third white balance gains.

R-Gain=MIX ratio×wR-Gain+(1−MIX ratio)×sR-Gain

G-Gain=MIX ratio×wG-Gain+(1−MIX ratio)×sG-Gain

B-Gain=MIX ratio×wB-Gain+(1−MIX ratio)×sB-Gain

On the other hand, when the system control unit 50 determines in S305 that the input image does not include specular reflection components, the system control unit 50 mixes the white balance gains based on white extraction (wR-Gain, wG-Gain, wB-Gain) and the white balance gains based on the sunlight (pR-Gain, pG-Gain, pB-Gain). As shown in the following equations, the final white balance gains (R-Gain, G-gain, B-Gain) are calculated through weighted addition as the third white balance gains.

R-Gain=MIX ratio×wR-Gain+(1−MIX ratio)×pR-Gain

G-Gain=MIX ratio×wG-Gain+(1−MIX ratio)×pG-Gain

B-Gain=MIX ratio×wB-Gain+(1−MIX ratio)×pB-Gain

Note that when the white balance gain for G is a fixed value "1" (that is to say, when G components are neither increased nor decreased), the above-described calculation of the white balance gain for G components is not necessary.

In S310, the system control unit 50 sets the calculated white balance gains in the WB amplification unit 201 (FIG. 2). The WB amplification unit 201 amplifies the input RGB values based on the set white balance gains.

As has been described above, in the present embodiment, the white balance gains calculated based on white pixels extracted from an image and the white balance gains calculated based on specular reflection components of the image are obtained. The final white balance gains are calculated by mixing the two sets of white balance gains in accordance with the degree of reliability of extraction of white pixels.

In this way, even if the degree of reliability of extraction of white pixels is low, when the input image includes specular reflection components, the accuracy of the white balance gains can be improved by taking into consideration the white balance gains based on the specular reflection components.

In the present embodiment, the final degree of reliability of white extraction is obtained by multiplying the three degrees of reliability calculated based on the following three conditions: the number of pixels that have been determined to be white (achromatic), the range of distribution of pixel values that have been determined to be white, and the ratio of pixels with colors that are likely to be determined to be white by error. Alternatively, the degree of reliability of white extraction may be obtained using other methods. For example, only one of the three degrees of reliability may be used as the final degree of reliability of white extraction, or the highest degree of reliability out of the three degrees of reliability may be used as the final degree of reliability of white extraction. Alternatively, the degree of reliability of white extraction is not limited to being calculated through multiplication, and may instead be calculated through other arithmetic operations such as addition.

Alternatively, the degree of reliability of white extraction may be calculated using other information. For example, the degree of reliability of white extraction may be calculated based on information related to the brightness of the object. When the brightness of the object is extremely high, it is determined that the image was captured outdoors, and the white extraction range 401 shown in FIG. 4A is replaced with an extremely small range 407 shown in FIG. 4B that corresponds to the sunlight. Such an extremely small white extraction range 407 reduces the range of pixel values that are extracted as white and lowers the possibility of erroneous white extraction. In view of this, the degree of reliability of white extraction may have the following characteristics: when the average luminance of an image and the luminance of a main object such as a face are determined to be sufficiently high, the calculated degree of reliability of white extraction is high, and when the average luminance of the image and the luminance of the main object are determined to be low, the calculated degree of reliability of white extraction is low.

While the present embodiment has provided an example in which an input image is divided into 64 blocks, that is to say, 8 blocks in the horizontal direction and 8 blocks in the vertical direction, the present embodiment is by no means limited to a specific method for dividing the input image into blocks or a specific number of blocks. For example, the input image may be divided into 64 blocks or more, or the entire input image may be treated as one block. Furthermore, the blocks are not limited to having the same size.

In the present embodiment, white extraction is performed using image signals based on the CxCy color space. Alternatively, image signals based on other color spaces such as a L*a*b color space may be used.

Second Embodiment

The following describes the second embodiment of the present invention. In the first embodiment, the MIX ratio of the white balance gains based on white extraction and the white balance gains based on other information is calculated in accordance with the degree of reliability of white extraction. On the other hand, in the second embodiment, a degree of reliability is calculated further in relation to determination as to whether or not the specular reflection components are included, and a MIX ratio of the white balance gains is calculated in accordance with both the degree of reliability of white extraction and the degree of reliability of determination regarding the specular reflection components.

As the present embodiment also can be implemented in the digital camera 100 described in the first embodiment, a description of the configuration of the digital camera 100 is omitted below. A description is now given of illuminant color estimation processing that is unique to the present embodiment with reference to the flowchart of FIG. 10.

Figure 10:
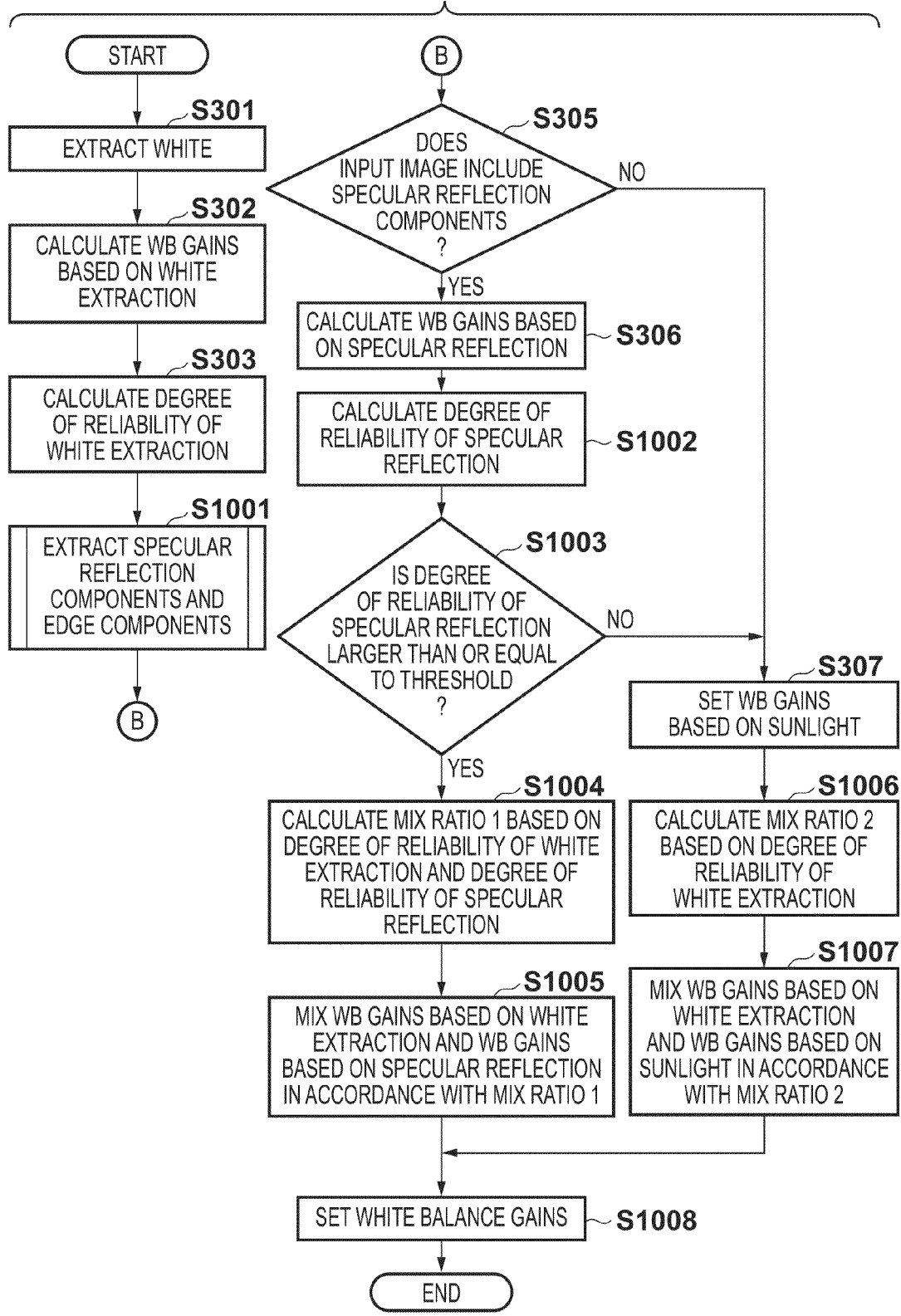
FIG. 10 is a flowchart of white balance gain calculation processing according to the second embodiment of the present invention.

As the processes of S301 to S303 in FIG. 10 are similar to the processes of S301 to S303 in FIG. 3 that have been described in the first embodiment, a specific description thereof is omitted below.

The system control unit 50 calculates the white balance gains based on white extraction (S301, 302), and calculates the degree of reliability of white extraction (S303).

Subsequently, in S1001, the system control unit 50 extracts specular reflection components and edge signal components. Specifics of processing for extracting the specular reflection components and edge signal components are described below with reference to the flowchart of FIG. 11.

Figure 11:
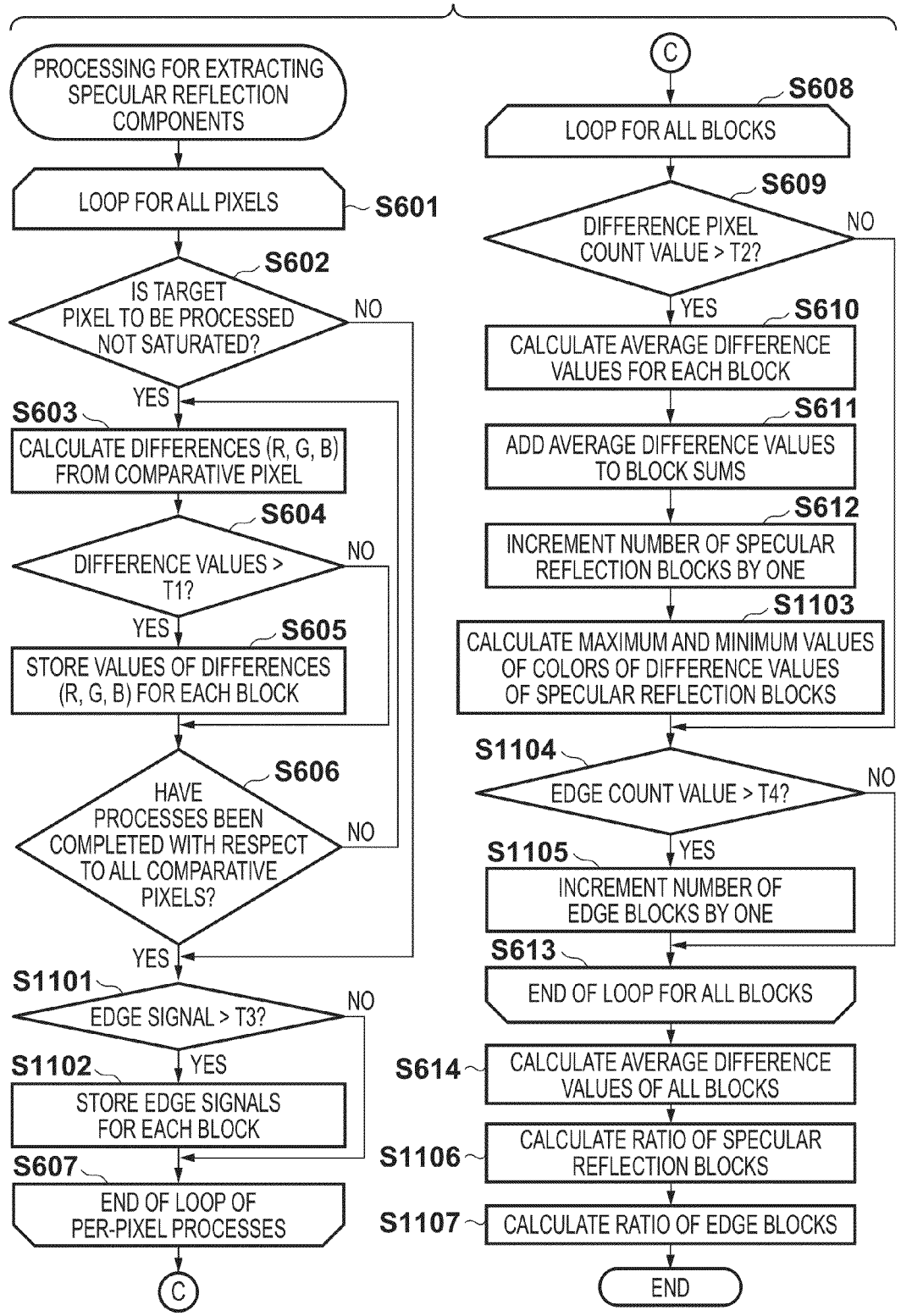
FIG. 11 is a flowchart of processing for extracting specular reflection components and edge components in S1001 of FIG. 10.

As the processes of S601 to S606 in FIG. 11 are similar to the processes of S601 to S606 in FIG. 6 that have been described in the first embodiment, a specific description thereof is omitted below. The system control unit 50 raster scans all pixels included in an input image, calculates differences between a target pixel to be processed and comparative pixels, and adds the differences that have a magnitude S larger than or equal to the threshold T1 to the difference values sumS for respective blocks and RGB components.

In S1101, the system control unit 50 obtains a pixel value of an edge signal corresponding to the position of the target pixel from the image memory 106, and compares the pixel value of the edge signal with a predetermined threshold T3. When the pixel value of the edge signal is larger than the threshold T3, the system control unit 50 determines that the target pixel is an edge pixel and proceeds to the process of S1102. On the other hand, when the pixel value of the edge signal is smaller than or equal to the threshold T3, the system control unit 50 determines that the target pixel is not the edge pixel and proceeds to the process of S607.

In S1102, the system control unit 50 adds the pixel values of edge signals for each block so as to calculate the sums of edges sumE for each block. The system control unit 50 also increments the edge count values countE for respective blocks. FIG. 8B shows examples of the sums of edges sumE and the edge count values countE calculated for respective blocks.

The system control unit 50 obtains the information shown in FIG. 8B (sums of differences, difference count values, sums of edges, and edge count values) by executing the processes of S601 to S607 with respect to all pixels.

The system control unit 50 calculates the average difference values (blkR, blkG, blkB) of the blocks including specular reflection components by executing the processes of S608 to S612 for respective blocks as in the first embodiment (the processes of S608 to S612 in FIG. 6).

In S1103, the system control unit 50 calculates the maximum and minimum values of the average difference values of the blocks (blkR, blkG, blkB). More specifically, the system control unit 50 first converts the average difference values of the blocks (blkR, blkG, blkB) into values of the CxCy color space (blkCx, blkCy). The system control unit 50 then compares blkCx with the maximum and minimum values in the Cx direction, i.e. Cx_maxS and Cx_minS, and compares blkCy with the maximum and minimum values in the Cy direction, i.e. Cy_maxS and Cy_minS.

When any component of the average difference values of the blocks (blkCx, blkCy) is larger than the corresponding maximum value or smaller than the corresponding minimum value, the system control unit 50 updates the values of Cx_maxS, Cy_maxS, Cx_minS, and Cy_minS. For example, assume the case where Cx_maxS=80, Cy_maxS=80, Cx_minS=20, and Cy_minS=20. In this case, when the average difference values of a target block to be processed (blkCx, blkCy)=(90, 60), the system control unit 50 updates Cx_maxS to 90.

In S1104, the system control unit 50 determines whether the edge count value countE of the target block is larger than a threshold T4, and when the edge count value countE of the target block is larger than the threshold T4, increments the number of edge blocks blkCountE by one in S1105. On the other hand, when the edge count value countE of the target block is smaller than or equal to the threshold T4, the system control unit 50 proceeds to process the next block.

The system control unit 50 obtains the number of edge blocks included in the entire image, i.e. blkCountE by executing the processes between S608 and S613 with respect to all blocks. Also, as in the first embodiment, the system control unit 50 obtains the number of specular reflection blocks blkCountS and block sums for the specular reflection blocks (sumBlkR, sumBlkG, sumBlkB).

In S614, the system control unit 50 calculates the average difference values (aveR, aveG, aveB) over all blocks by dividing each component of the sums of specular reflection blocks (sumBlkR, sumBlkG, sumBlkB) by the number of specular reflection blocks blkCountS.

In S1106, the system control unit 50 calculates the ratio of the number of specular reflection blocks blkCountS to the total number of blocks (8×8=64 blocks) using the following equation.

Ratio of specular reflection blocks=blkCount$S$/64

In S1107, the system control unit 50 calculates the ratio of the number of edge blocks blkCountE to the total number of blocks (8×8=64 blocks) using the following equation.

Ratio of edge blocks=blkCount$E$/64

In the above manner, the number of blocks that have been determined to include specular reflection components, the ratio of the blocks that have been determined to include specular reflection components, the ratio of blocks that have been determined to include edges, the color of specular reflection components (the average difference values of specular reflection blocks), and the maximum and minimum values of the specular reflection components are obtained.

Returning to FIG. 10, in S305, the system control unit 50 determines whether or not the input image includes specular reflection components. More specifically, the system control unit 50 determines that the input image includes specular reflection components when the number of specular reflection blocks blkCountS is larger than or equal to a predetermined threshold. The system control unit 50 proceeds to the process of S306 when it determines that the input image includes specular reflection components, and to the process of S307 when it determines that the input image does not include specular reflection components.

In S306, the system control unit 50 calculates white balance gains based on the specular reflection components (second white balance gains). Note that the processes of S305 and 306 are similar to the processes of S305 and 306 described in the first embodiment.

Figure 12A:
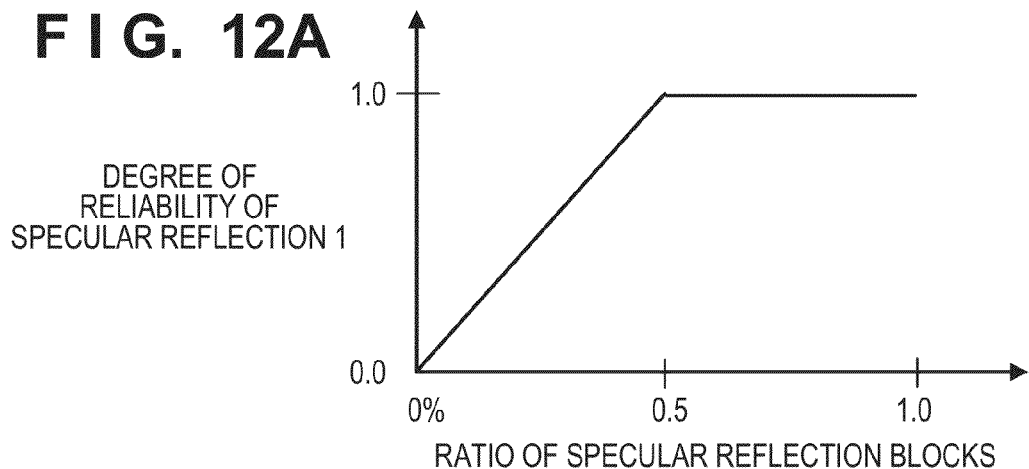
FIGS. 12A to 12C show examples of the characteristics of degrees of reliability of specular reflection 1 to 3 according to the second embodiment of the present invention.
Figure 12B:
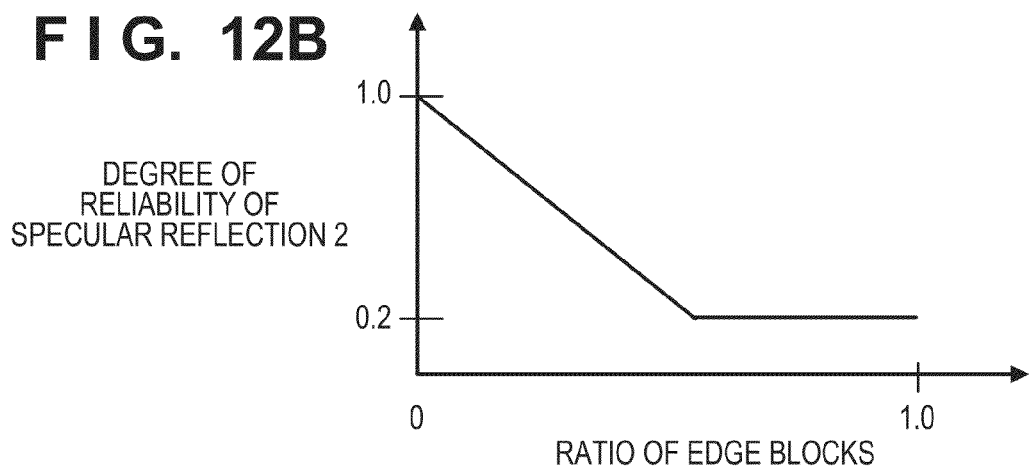
Figure 12C:
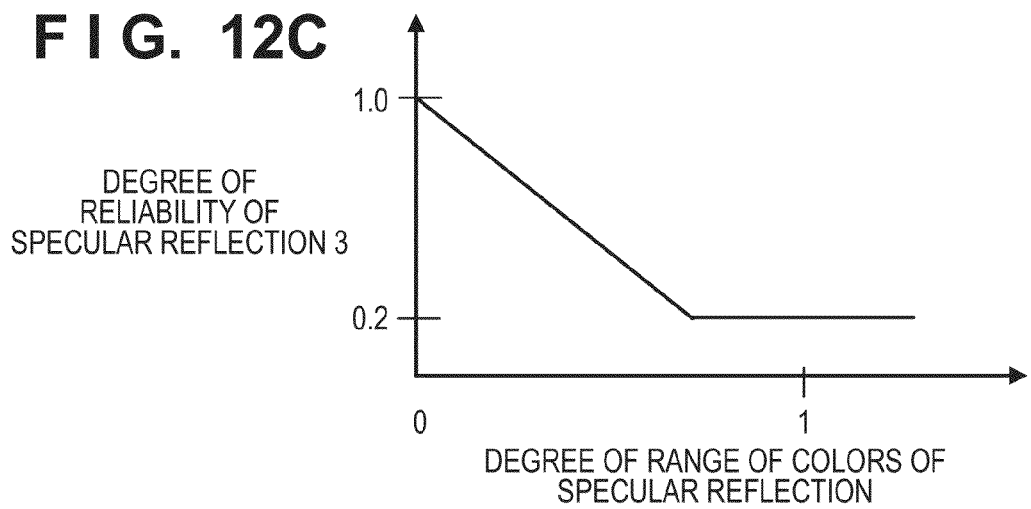

In S1002, the system control unit 50 calculates a degree of reliability of the extracted specular reflection components (a degree of reliability of specular reflection). A description is now given of a method for calculating the degree of reliability of specular reflection according to the present embodiment with reference to FIGS. 12A to 12C. In the present embodiment, degrees of reliability of specular reflection 1 to 3 are calculated first, and the final degree of reliability of specular reflection is obtained by multiplying the degrees of reliability of specular reflection 1 to 3.

(Calculation of Degree of Reliability of Specular Reflection 1)

The degree of reliability of specular reflection 1, which is a first degree of reliability of specular reflection, depends on the ratio of specular reflection blocks to the total number of blocks included in the entire image, that is to say, the ratio of regions that have been determined to include specular reflection components to the entire image. The degree of reliability of specular reflection 1 is calculated based on a relationship between the ratio of specular reflection blocks and the degree of reliability of specular reflection 1 exemplarily shown in FIG. 12A. In the present embodiment, the degree of reliability of specular reflection 1 linearly increases from 0 to 1.0 when the ratio of the specular reflection blocks is 0 to 0.5, and remains at 1.0 when the ratio of the specular reflection blocks exceeds 0.5. The system control unit 50 stores the relationship between the ratio of the specular reflection blocks and the degree of reliability of specular reflection 1 exemplarily shown in FIG. 12A as a table, a function, and the like. This way, the system control unit 50 can calculate the degree of reliability of specular reflection 1 using the ratio of the specular reflection blocks calculated in S1106 of FIG. 11.

(Calculation of Degree of Reliability of Specular Reflection 2)

The degree of reliability of specular reflection 2, which is a second degree of reliability of specular reflection, depends on the ratio of edge blocks to the total number of blocks included in the entire image, that is to say, the ratio of regions that have been determined to include edges to the entire image. The degree of reliability of specular reflection 2 is calculated based on a relationship between the ratio of edge blocks and the degree of reliability of specular reflection 2 exemplarily shown in FIG. 12B. In the present embodiment, the degree of reliability of specular reflection 2 is 1.0 when the ratio of the edge blocks is 0, and linearly decreases as the ratio of the edge blocks increases. Once the degree of reliability of specular reflection 2 hits the minimum value (in the present embodiment, 0.2), it remains at the minimum value. The system control unit 50 stores the relationship between the ratio of the edge blocks and the degree of reliability of specular reflection 2 exemplarily shown in FIG. 12B as a table, a function, and the like. This way, the system control unit 50 can calculate the degree of reliability of specular reflection 2 using the ratio of the edge blocks calculated in S1107 of FIG. 11. In an image including many edges, the differences between a target pixel to be processed and comparative pixels are large. More specifically, in an image including many edges, the differences between the target pixel and comparative pixels are likely to be large because an object often has patterns. These differences cannot be distinguished from differences attributed to specular reflection, which are fundamentally desired to be extracted. For this reason, the degree of reliability of specular reflection 2 is lowered for an image including many edges.

(Calculation of Degree of Reliability of Specular Reflection 3)

The degree of reliability of specular reflection 3, which is a third degree of reliability of specular reflection, is calculated based on a degree of range of distribution of the colors of specular reflection components. More specifically, a degree of range of colors based on specular reflection is calculated based on the maximum values (Cx_maxS, Cy_maxS) and the minimum values (Cx_minS, Cy_minS) of the colors of specular reflection blocks calculated in S1103 of FIG. 11. The system control unit 50 calculates the degree of range of specular reflection based on a difference between the maximum and minimum values of the colors of specular reflection block as follows.

Degree of range of specular reflection in $Cx$ direction=$(Cx\_maxS-Cx\_minS)/Cx\_base$ Degree of range of specular reflection in $Cy$ direction=$(Cy\_maxS-Cy\_minS)/Cy\_base$ Note that Cx_base and Cy_base represent the maximum dimensions of the white extraction range 401 as shown in FIG. 4A.

The system control unit 50 obtains the degree of range of specular reflection by adding the calculated degrees of range of specular reflection in the Cx and Cy directions. The system control unit 50 then calculates the degree of reliability of specular reflection 3 based on a relationship between the degree of range of specular reflection and the degree of reliability of specular reflection 3 exemplarily shown in FIG. 13C. In the present embodiment, the degree of reliability of specular reflection 3 is 1.0 when the degree of range of specular reflection is 0, and linearly decreases as the degree of range of specular reflection increases. Once the degree of reliability of specular reflection 3 hits the minimum value (in the present embodiment, 0.2), it remains at the minimum value.

When a difference between the maximum and minimum values of the colors of specular reflection components is large, it means that the colors of specular reflection components vary to a great extent and stable data cannot be extracted. For this reason, the degree of reliability of specular reflection is low when the degree of range of specular reflection is high.

Once the degrees of reliability of specular reflection 1 to 3 have been calculated in the above manner, the system control unit 50 calculates the final degree of reliability of specular reflection by multiplying the degrees of reliability of specular reflection 1 to 3 as follows.

Degree of reliability of specular reflection=degree of reliability of specular reflection 1×degree of reliability of specular reflection 2×degree of reliability of specular reflection 3

Returning to FIG. 10, in S1003, the system control unit 50 determines whether the degree of reliability of specular reflection is larger than or equal to a predetermined threshold (for example, 0.4).

The system control unit 50 proceeds to the process of S1004 when it determines that the degree of reliability of specular reflection is larger than or equal to the threshold, and to the process of S307 when it determines that the degree of reliability of specular reflection is smaller than the threshold.

In S1004, the system control unit 50 calculates a MIX ratio 1 of the white balance gains based on the degree of reliability of white extraction and the degree of reliability of specular reflection. The MIX ratio 1 can be expressed by the following equation.

MIX ratio 1=degree of reliability of white extraction/
(degree of reliability of white extraction+degree
of reliability of specular reflection)

In other words, the MIX ratio 1 is a weight corresponding to the ratio of the degree of reliability of white extraction to the sum of the degree of reliability of white extraction and the degree of reliability of specular reflection. On the other hand, (1−MIX ratio) is a weight corresponding to the ratio of the degree of reliability of specular reflection to the sum of the degree of reliability of white extraction and the degree of reliability of specular reflection.

In S1005, the system control unit 50 calculates the final white balance gains by mixing the white balance gains based on white extraction (wR-Gain, wG-Gain, wB-Gain) and the white balance gains based on specular reflection (sR-Gain, sG-Gain, sB-Gain) in accordance with the MIX ratio 1.

The following are the equations for calculating the final white balances.

$$R\text{-Gain}=w R\text{-Gain}\times \text{MIX ratio 1}+s R\text{-Gain}\times(1-\text{MIX ratio 1})$$

$$G\text{-Gain}=w G\text{-Gain}\times \text{MIX ratio 1}+s G\text{-Gain}\times(1-\text{MIX ratio 1})$$

$$B\text{-Gain}=w B\text{-Gain}\times \text{MIX ratio 1}+s B\text{-Gain}\times(1-\text{MIX ratio 1})$$

Note that when the white balance gain for G is a fixed value "1" (that is to say, when G components are neither increased nor decreased), the calculation of G-Gain is not necessary.

In S307, the system control unit 50 sets the white balance gain values based on the sunlight that have been prepared in the non-volatile memory 124 in advance as the white balance gain values. This process is the same as the process of S307 described in the first embodiment.

In S1006, the system control unit 50 calculates a MIX ratio 2 of the white balance gains based on the degree of reliability of white extraction. Note that the value of the degree of reliability of white extraction is set as the MIX ratio 2 (MIX ratio 2=the degree of reliability of white extraction).

In S1007, the system control unit 50 mixes the white balance gains based on white extraction (wR-Gain, wG-Gain, wB-Gain) and the gains based on the sunlight (pR-Gain, pG-Gain, pB-Gain).

The following are the equations for calculating the final white balances.

$$R\text{-Gain}=w R\text{-Gain}\times \text{MIX ratio 2}+p R\text{-Gain}\times(1-\text{MIX ratio 2})$$

$$G\text{-Gain}=w G\text{-Gain}\times \text{MIX ratio 2}+p G\text{-Gain}\times(1-\text{MIX ratio 2})$$

$$B\text{-Gain}=w B\text{-Gain}\times \text{MIX ratio 2}+p B\text{-Gain}\times(1-\text{MIX ratio 2})$$

Note that when the white balance gain for G is a fixed value "1" (that is to say, when G components are neither increased nor decreased), the calculation of G-Gain is not necessary.

In S1008, the system control unit 50 sets the calculated final white balance gains in the WB amplification unit 201 (FIG. 2). The WB amplification unit 201 amplifies the input RGB values based on the set white balance gains.

As has been described above, the present embodiment adopts a configuration in which a degree of reliability of specular reflection is calculated in addition to the configuration of the first embodiment, and MIX ratios of the white balance gains are calculated using two degrees of reliability, i.e. the degree of reliability of white extraction and the degree of reliability of specular reflection.

With this configuration, white balance gains with high reliability are emphasized in the generation of white balance gains, thereby enabling white balance control with higher accuracy.

With the configuration described in the present embodiment, MIX ratios of two sets of white balance gains are calculated and the two sets of white balance gains are mixed. However, the present embodiment need not necessarily adopt a configuration in which the two sets of gain values are mixed. Alternatively, for example, a configuration may be adopted in which the degree of reliability of white extraction and the degree of reliability of specular reflection are compared and the white balance gains based on a higher degree of reliability are set as the final white balance gains.

While the present embodiment has described a configuration in which two sets of white balance gains are mixed, the present embodiment may adopt a configuration in which three or more sets of white balance gains, including the white balance gains based on the sunlight, are mixed. For example, a configuration may be adopted in which the white balance gains based on the sunlight are also mixed when the sum of the degree of reliability of white extraction and the degree of reliability of specular reflection is smaller than one. In this case, provided that $\alpha=1-$(degree of reliability of white extraction+degree of reliability of specular reflection), the final white balance gains can be expressed by the following equations.

$$R\text{-Gain}=\text{degree of reliability of white extraction}\times w R\text{-Gain}+\text{degree of reliability of specular reflection}\times s R\text{-Gain}+\alpha\times p R\text{-Gain}$$

$$G\text{-Gain}=\text{degree of reliability of white extraction}\times w G\text{-Gain}+\text{degree of reliability of specular reflection}\times s G\text{-Gain}+\alpha\times p G\text{-Gain}$$

$$B\text{-Gain}=\text{degree of reliability of white extraction}\times w B\text{-Gain}+\text{degree of reliability of specular reflection}\times s B\text{-Gain}+\alpha\times p B\text{-Gain}$$

With the configuration described in the present embodiment, when the degree of reliability of specular reflection is low, the white balance gains based on the sunlight are mixed instead of the white balance gains based on specular reflection. Alternatively, other white balance gains may be mixed. For example, instead of the white balance gains based on specular reflection, white balance gains based on an incandescent lamp may be mixed when the input image is reddish as a whole, and white balance gains based on the shade may be mixed when the input image is bluish as a whole.

While the degree of reliability of specular reflection is calculated based on the ratio of specular reflection blocks, the ratio of edge blocks and the degree of range of the colors of specular reflection components in the present embodiment, the degree of reliability of specular reflection may be calculated using other methods. More specifically, the degree of reliability of specular reflection may be calculated using any method as long as it is calculated based on any of the amount of specular reflection, the characteristics of edges, and the color characteristics of specular reflection. For example, the degree of reliability of specular reflection may be calculated based only on the amount of specular reflection components.

While the degree of range of the colors of specular reflection components is determined based on a difference between the maximum and minimum values of the colors of specular reflection components in the present embodiment, the degree of range of the colors of specular reflection components may be calculated based on a distribution value of the colors of specular reflection components. In this case, when the distribution value is large, it is considered that the specular reflection components vary, and the degree of reliability is lowered.

While the degree of reliability of specular reflection is calculated directly using the number of edge blocks in the present embodiment, edge information may be used in determining whether or not each block is a specular reflection block. In this case, blocks that have been determined to be edge blocks are controlled so that they are not considered to be specular reflection blocks. For example, in the determination of S609 in FIG. 11, the target block is added as a specular reflection block when both of the following conditions are satisfied: "the difference count value countS is larger than the threshold T2" and "the edge count value countE is smaller than a threshold value T5". In this way, when there are more edge blocks, there are fewer specular reflection blocks. As a result, the number of edge blocks can be reflected in the degree of reliability of specular reflection.

Furthermore, object recognition may be performed. In this case, the degree of reliability of specular reflection may be determined using the result of the object recognition as information other than the amount of specular reflection, the characteristics of edges, and the color characteristics of specular reflection.

Figure 13:
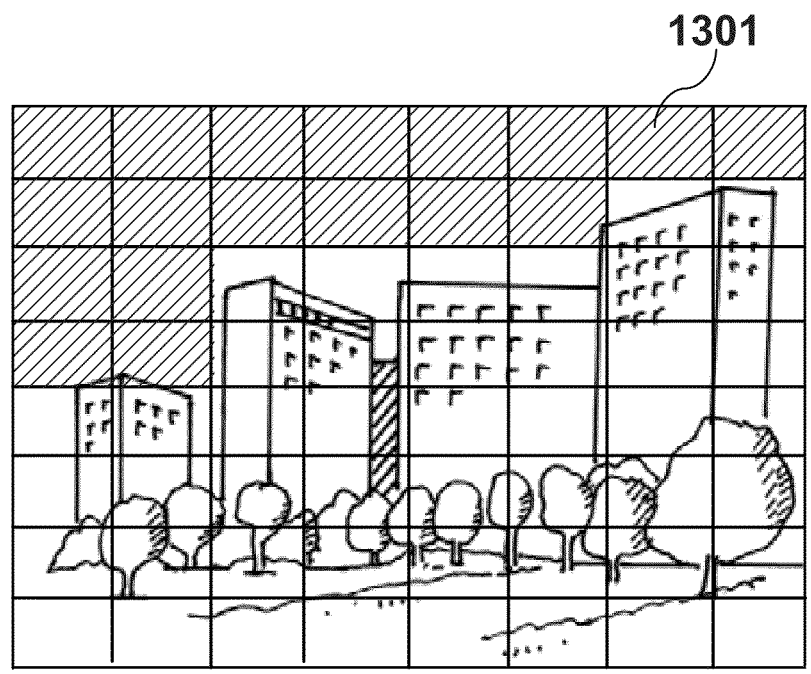
FIG. 13 illustrates an example of object recognition according to an exemplary modification of the second embodiment of the present invention.

An object recognition process is executed during the processes for calculating the degree of reliability of specular reflection shown in FIG. 11. For the sake of simplicity, it is assumed here that a blue sky, which does not include specular reflection components, is recognized in the object recognition process. FIG. 13 shows an object image including a blue sky divided into 8×8=64 blocks.

For example, the system control unit 50 calculates blue sky evaluation values for respective blocks using the image processing unit 105 so as to determine whether or not the blocks include the blue sky. The blue sky evaluation values are calculated in accordance with a position and a color in the image. For example, a block located in the upper part of the image and a block in which a predetermined hue (blue) has a higher saturation have a higher blue sky evaluation value. The system control unit 50 determines that the blocks having a blue sky evaluation value larger than a predetermined threshold are blue sky blocks, and obtains the total number of the blue sky blocks. In FIG. 13, hatched blocks 1301 represent the blocks that have been determined to be the blue sky blocks.

When the ratio of the blue sky blocks to the entire image (the total number of blue sky blocks/64) exceeds a predetermined threshold (for example, 0.7), it is considered that the ratio of objects exhibiting specular reflection is small. Therefore, the system control unit 50 uses a predetermined value smaller than 1.0 (a constant value or a value that decreases as the ratio of the blue sky blocks increases) as the final degree of reliability of specular reflection.

As described above, in the case where a main object is a blue sky that does not exhibit specular reflection, control is performed to lower the degree of reliability of specular reflection and emphasize the white balance gains based on white extraction and the sunlight. In this way, a degree of reliability of specular reflection can be calculated with higher accuracy.

While the degree of reliability of specular reflection may be calculated based only on the result of the object recognition, the degree of reliability of specular reflection may be calculated based on a combination of the result of the object recognition and other information as with the configuration of the second embodiment. For example, control may be performed such that the blocks that have been recognized to be blue sky blocks as a result of the object recognition are not considered to be specular reflection blocks.

For example, in the determination of S609 in FIG. 11, the target block is added as a specular reflection block when both of the following conditions are satisfied: "the difference count value countS is larger than the threshold T2" and "the target block is not a blue sky block". In this way, when the specular reflection blocks include blue sky blocks, the number of specular reflection blocks blkCountS is decreased. That is to say, when there are many blue sky blocks, the degree of reliability of specular reflection is low.

While the above has described an example in which a blue sky is recognized through the object recognition, any other object may be recognized as long as the degree of reliability of specular reflection is calculated based on information of the object recognition. For example, in the case where a cloth, metal, a human face, and the like are recognized through the object recognition process, the degree of reliability of specular reflection may be decreased for the cloth that is not likely to exhibit specular reflection, and the degree of reliability of specular reflection may be increased for the metal and human face that are likely to exhibit specular reflection.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
 a pixel extraction unit that extracts, from an input image, pixels having an achromatic color that are included in a predetermined extraction range in a predetermined color space;
 a component extraction unit that extracts specular reflection components included in the input image; and
 an obtainment unit that obtains white balance gains used for the input image based on both a result of a pixel extraction by the pixel extraction unit and a result of a component extraction by the component extraction unit.

2. The image processing apparatus according to claim 1, wherein the obtainment unit obtains the white balance gains based on a degree of reliability of the pixel extraction or on a degree of reliability of the component extraction.

3. The image processing apparatus according to claim 1, wherein the obtainment unit uses first white balance gains based on values of the extracted pixels as the white balance gains when a degree of reliability of the pixel extraction is higher than a degree of reliability of the component extraction, and uses second white balance gains based on the extracted specular reflection components as the white balance gains when the degree of reliability of the component extraction is higher than the degree of reliability of the pixel extraction.

4. The image processing apparatus according to claim 1, further comprising a first degree of reliability obtainment unit that obtains a degree of reliability of the pixel extraction performed by the pixel extraction unit, wherein the first degree of reliability obtainment unit obtains the degree of reliability of the pixel extraction based on at least one of:
   a first degree of reliability of extraction that is higher for a larger ratio of the number of the pixels extracted by the pixel extraction unit to the number of pixels included in the input image;
   a second degree of reliability of extraction that is lower for a larger range of distribution of the values of the pixels extracted by the pixel extraction unit; and
   a third degree of reliability of extraction that is lower for a larger ratio of the number of pixels that are included in the input image and have colors included in a predetermined range to the number of the pixels extracted by the pixel extraction unit.

5. The image processing apparatus according to claim 1, further comprising a second degree of reliability obtainment unit that obtains a degree of reliability of the component extraction performed by the component extraction unit, wherein the second degree of reliability obtainment unit obtains the degree of reliability of the component extraction based on at least one of:
   a first degree of reliability of specular reflection that is higher for a larger ratio of regions that have been determined to include specular reflection components to the input image;
   a second degree of reliability of specular reflection that is lower for a larger ratio of regions that have been determined to include edges to the input image; and
   a third degree of reliability of specular reflection that is lower for a larger range of distribution of values of the specular reflection components extracted by the component extraction unit.

6. The image processing apparatus according to claim 1, further comprising:
   a first obtainment unit that obtains first white balance gains corresponding to the input image based on values of the extracted pixels; and
   a second obtainment unit that obtains second white balance gains corresponding to the input image based on the extracted specular reflection components,
   wherein the obtainment unit obtains the white balance gains used for the input image based on the first white balance gains and on the second white balance gains.

7. The image processing apparatus according to claim 6, wherein the obtainment unit obtains the white balance gains used for the input image by combining the first white balance gains and the second white balance gains based on a degree of reliability of the first white balance gains or on a degree of reliability of the second white balance gains.

8. A method for controlling an image processing apparatus, comprising:
   extracting, from an input image, pixels having an achromatic color that are included in a predetermined extraction range in a predetermined color space;
   extracting specular reflection components included in the input image; and
   obtaining white balance gains used for the input image based on both a result of a pixel extraction and a result of a specular reflection component extraction.

9. A non-transitory computer-readable medium having stored therein a program for causing a computer to function as an image processing apparatus comprising:
   a pixel extraction unit that extracts, from an input image, pixels having an achromatic color that are included in a predetermined extraction range in a predetermined color space;
   a component extraction unit that extracts specular reflection components included in the input image; and
   an obtainment unit that obtains white balance gains used for the input image based on both a result of a pixel extraction by the pixel extraction unit and a result of a component extraction by the component extraction unit.

10. The method according to claim 8, wherein the obtaining comprises:
    obtaining first white balance gains corresponding to the input image based on values of the extracted pixels;
    obtaining second white balance gains corresponding to the input image based on the extracted specular reflection components; and
    obtaining the white balance gains used for the input image based on the first white balance gains and the second white balance gains.

* * * * *